United States Patent
Campton et al.

(10) Patent No.: US 11,215,242 B2
(45) Date of Patent: Jan. 4, 2022

(54) SHIFTING SYSTEM FOR VEHICLE TRANSMISSION AND METHOD OF OPERATING THE SAME

(71) Applicant: BorgWarner Inc., Auburn Hills, MI (US)

(72) Inventors: Calahan B. Campton, Royal Oak, MI (US); R. Keith Martin, Marlette, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/116,239

(22) Filed: Dec. 9, 2020

(65) Prior Publication Data

US 2021/0172483 A1  Jun. 10, 2021

Related U.S. Application Data

(60) Provisional application No. 63/091,775, filed on Oct. 14, 2020, provisional application No. 62/946,156, filed on Dec. 10, 2019.

(51) Int. Cl.
*F16D 41/16* (2006.01)
*F16D 41/12* (2006.01)
(Continued)

(52) U.S. Cl.
CPC .......... *F16D 41/125* (2013.01); *F16D 28/00* (2013.01); *F16D 41/16* (2013.01); *F16H 3/66* (2013.01); *F16H 2063/3093* (2013.01)

(58) Field of Classification Search
CPC ...... F16H 3/10; F16H 3/08; F16H 2003/0803; F16H 3/089; F16D 13/52; F16D 13/56; F16D 41/16
See application file for complete search history.

(56) References Cited

U.S. PATENT DOCUMENTS 9,151,345 B2   10/2015  Showalter
9,726,236 B2    8/2017  Papania
(Continued)

FOREIGN PATENT DOCUMENTS

DE   102019003004 A1 * 10/2020 ............ F16H 3/089
FR       2604228 A1    3/1988

OTHER PUBLICATIONS

Back, Ottmar, "Basics of Synchronizers", Hoerbiger, Jan. 2013, 78 pages.
(Continued)

*Primary Examiner* — Stacey A Fluhart
(74) *Attorney, Agent, or Firm* — Howard & Howard Attorneys PLLC

(57) ABSTRACT

A shifting system for a vehicle transmission includes an input member and a selectable one-way clutch rotatably coupled to the input member. The selectable one-way clutch is moveable between first, second, and third clutch positions. The shifting system also includes a disconnect coupled to the input member and moveable between first and second disconnect positions, and an output member selectively rotatable with the input member. The shifting system further includes a shifting assembly for selectively rotatably coupling the input and output members. The shifting assembly includes an input hub coupled to the input member, having a disconnectable component engageable with the disconnect, and having a clutch engagement component. Clutch plates are coupled to the clutch engagement component and are moveable between engaged and disengaged positions. A clutch plate carrier is coupled to the clutch plates and output member to transmit torque from the clutch engagement component to the output member.

20 Claims, 17 Drawing Sheets

(51) Int. Cl.
*F16D 28/00* (2006.01)
*F16H 3/66* (2006.01)
*F16H 63/30* (2006.01)

(56) References Cited

U.S. PATENT DOCUMENTS

| | | | |
|---|---|---|---|
| 9,797,458 | B2 | 10/2017 | Damm et al. |
| 9,939,027 | B2 | 4/2018 | Damm et al. |
| 10,151,359 | B2 | 12/2018 | Campton |
| 2011/0155530 | A1 | 6/2011 | Vierk et al. |
| 2014/0033844 | A1* | 2/2014 | Rothvoss ............... F16H 3/10 74/335 |
| 2014/0318918 | A1 | 10/2014 | Mordukhovich |
| 2018/0112725 | A1* | 4/2018 | Campton ............... F16D 41/16 |
| 2018/0126839 | A1* | 5/2018 | Park ..................... B60K 6/547 |
| 2018/0335110 | A1* | 11/2018 | Yang .................... F16D 41/064 |
| 2019/0301576 | A1* | 10/2019 | Harada ............... F16H 61/0213 |
| 2019/0351762 | A1* | 11/2019 | Yang ..................... B60K 1/00 |
| 2020/0309201 | A1* | 10/2020 | Genesius ............... F16D 25/08 |
| 2020/0347916 | A1* | 11/2020 | Sung ..................... B60W 10/10 |
| 2021/0164543 | A1* | 6/2021 | Yang .................... F16H 3/089 |

OTHER PUBLICATIONS

Echtler, Peter et al, "Presentation: Alternative Schaltelemente—E-Drive+ Concept with TorqueLINE Twin Cone and TorqueLINE Disconnect Clutch", 16th International CTI Symposium, Berlin, Hoerbiger Antriebstechnik Holding GmbH, Dec. 2017, 28 pages.
Echtler, Peter et al., "Innovative Shift Elements For Power-Shiftable Two-Speed Electric Axle With Torque Vactoring Function", Horerbiger Antriebstechnik Holding GmbH, Germany, 2018, 13, pages.
U.S. Appl. No. 17/112,181, filed Dec. 4, 2020.
U.S. Appl. No. 17/116,209, filed Dec. 9, 2020.
U.S. Appl. No. 17/116,263, filed Dec. 9, 2020.
English language abstract and machine-assisted English language translation for FR 2 604 228 A1 extracted from espacenet.com database on Sep. 29, 2021, 9 pages.

* cited by examiner

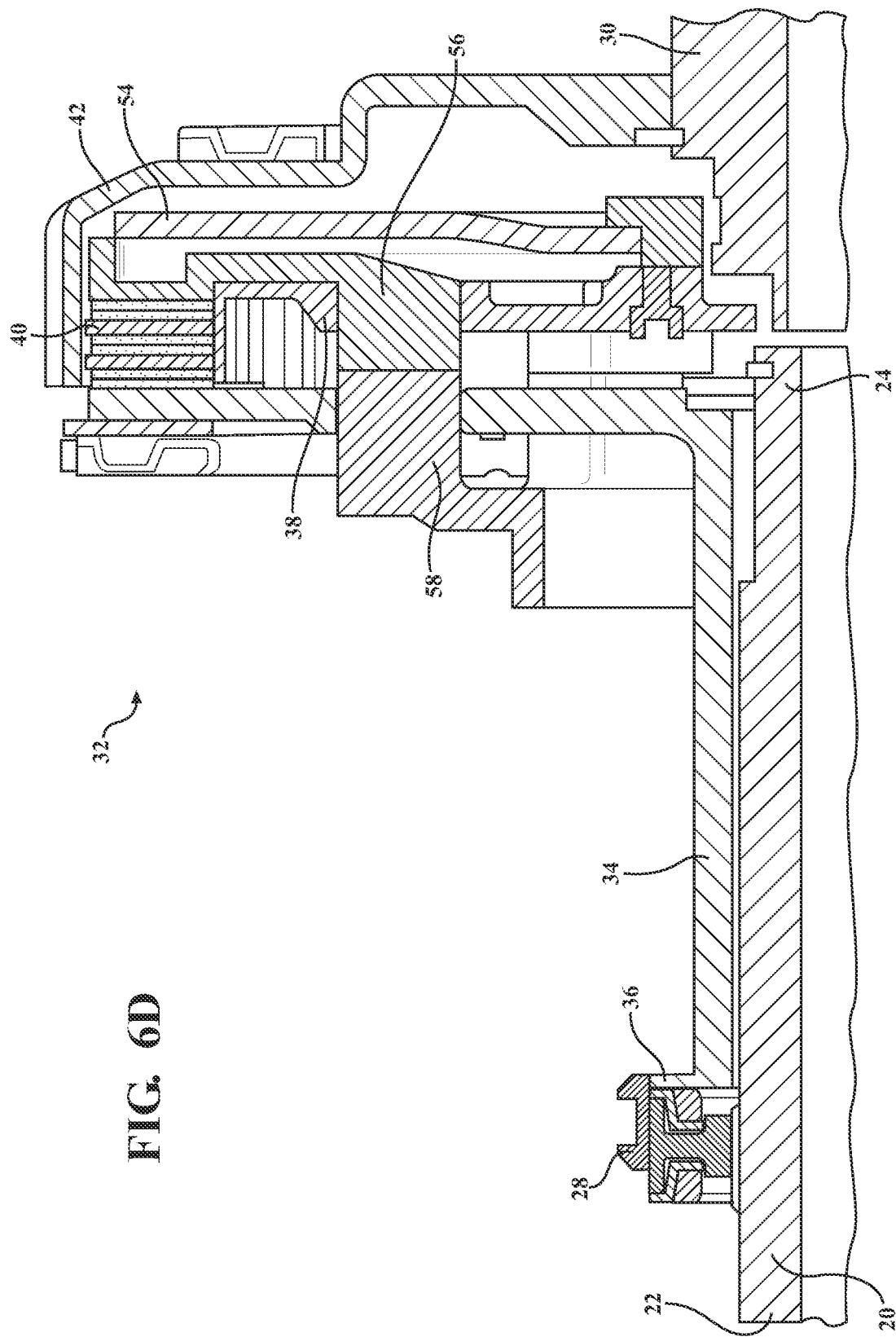

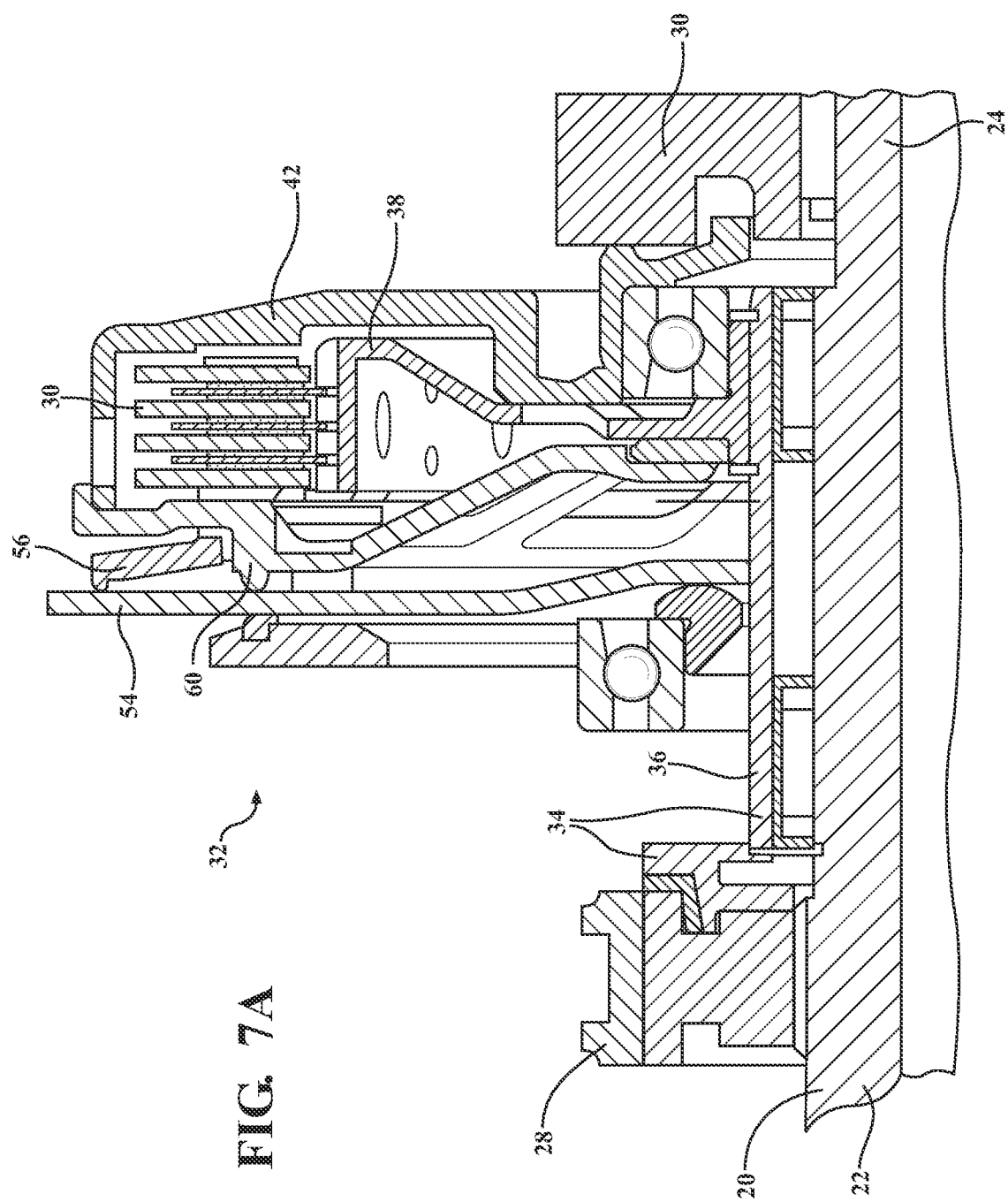

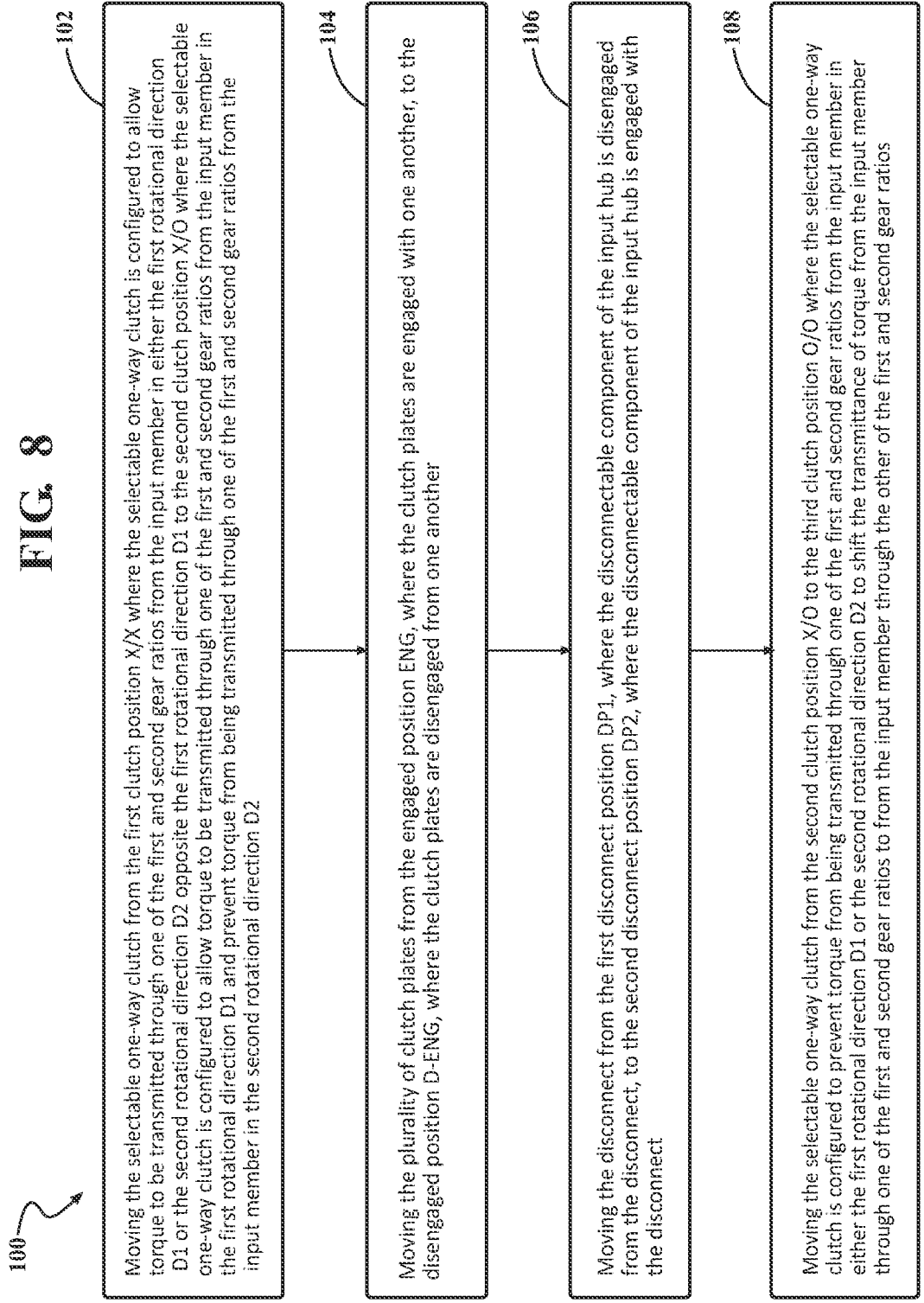

SHIFTING SYSTEM FOR VEHICLE TRANSMISSION AND METHOD OF OPERATING THE SAME

CROSS-REFERENCE TO RELATED APPLICATIONS

The present application claims priority to and all the benefits of U.S. Provisional Patent Application No. 62/946,156 filed on Dec. 10, 2019, and 63/091,775 filed on Oct. 14, 2020, which are expressly incorporated herein by reference in their entirety.

BACKGROUND OF THE INVENTION

1. Field of the Invention

The present invention generally relates to a shifting system for a vehicle transmission, and to a method of operating the shifting system.

2. Description of the Related Art

Conventional vehicles known in the art typically include a motor having a rotational output as a rotational input into a vehicle transmission. The motor is typically an internal combustion engine or an electric motor, and generates the rotational output which is selectively transferred to the vehicle transmission which, in turn, transfers rotational torque to one or more wheels of the vehicle. The vehicle transmission changes the rotational speed and torque generated by the motor through a series of predetermined gearsets, whereby changing between the gearsets enables the vehicle to travel at different vehicle speeds for a given motor speed. Commonly, the motor is the electric motor coupled to the vehicle transmission in an axle connected to the wheels of the vehicle.

Rotational input into the vehicle transmission typically requires a shifting system to selectively transfer torque to the components of the vehicle transmission. A typical shifting system includes an input member (e.g. the rotational output from the motor) rotatable about an axis, a disconnect coupled to the input member, and an output member (e.g. the rotational input to the vehicle transmission) selectively rotatable with the input member about the axis. A shifting assembly is also typically required to selectively rotatably couple the input member and the output member.

The shifting systems known in the art often suffer from high drag losses, which lowers the efficiency of torque transfer between the motor and the vehicle transmission. Additionally, typical shifting systems produce rough engagement between the motor and the components of the vehicle transmission through connection with the disconnect, resulting in vibrations of the vehicle and an uncomfortable driving experience.

Accordingly, it is desirable to provide an improved shifting system for vehicle transmissions.

SUMMARY OF THE INVENTION AND ADVANTAGES

A shifting system for a vehicle transmission includes an input member extending along an axis between a first end and a second end spaced from the first end. The vehicle transmission has a gearset including a first gear ratio and a second gear ratio different from the first gear ratio. The input member is rotatable about the axis. The shifting system further includes a selectable one-way clutch rotatably coupled to the input member. The selectable one-way clutch is moveable between a first clutch position, a second clutch position, and a third clutch position.

In the first clutch position, the selectable one-way clutch is configured to allow torque to be transmitted through one of the first and second gear ratios of the gearset from the input member in either a first rotational direction or a second rotational direction opposite the first rotational direction. In the second clutch position, the selectable one-way clutch is configured to allow torque to be transmitted through one of the first and second gear ratios of the gearset from the input member in the first rotational direction and prevent torque from being transmitted through one of the first and second gear ratios of the gearset from the input member in the second rotational direction. In the third clutch position, the selectable one-way clutch is configured to prevent torque from being transmitted through one of the first and second gear ratios of the gearset from the input member in either the first rotational direction or the second rotational direction.

The shifting system also includes a disconnect coupled to the input member. The disconnect is moveable between a first disconnect position and a second disconnect position. An output member is spaced from the input member, and the output member is selectively rotatable with the input member about the axis to selectively transmit torque through the other of the first and second gear ratios of the gearset.

The shifting system further includes a shifting assembly for selectively rotatably coupling the input member and the output member. The shifting assembly includes an input hub coupled to the input member. The input hub has a disconnectable component engageable with the disconnect, and the disconnectable component of the input hub is disengaged from the disconnect when the disconnect is in the first disconnect position and the disconnectable component of the input hub is engaged with the disconnect when the disconnect is in the second disconnect position.

The input hub has a clutch engagement component. The shifting assembly also includes a plurality of clutch plates coupled to the clutch engagement component of the input hub. The plurality of clutch plates is moveable between an engaged position and a disengaged position. In the engaged position, the clutch plates are engaged with one another. In the disengaged position, the clutch plates are disengaged from one another. The shifting assembly further includes a clutch plate carrier coupled to the plurality of clutch plates and to the output member to transmit torque from the clutch engagement component of the input hub, through the plurality of clutch plates and the clutch plate carrier, to the output member.

Accordingly, the shifting system results in low drag losses, which increases the efficiency of torque transfer between a motor and the vehicle transmission. Moreover, the shifting system produces smooth engagement between the motor and the vehicle transmission through the shifting assembly (i.e., through the connection with the disconnect and engagement of the plurality of clutch plates), resulting in fewer vibrations and a more comfortable driving experience. Furthermore, the selectable one-way clutch allows the shifting system to achieve low spin losses by rotatably decoupling the shifting assembly when torque is not required to be transmitted through the shifting assembly. The low spin losses allowed by the combination of the selectable one-way clutch and the shifting assembly allow the first and second gear ratios of the vehicle transmission to achieve a net energy savings as compared to a single speed transmission.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6D is a cross-sectional view of the shifting assembly, with the disconnect being a synchronizer, and with the disconnect in the second disconnect position where the disconnect is engaged with the input hub, and the apply plate is in the first disconnect position where the plurality of clutch plates are in the engaged position;

FIG. 7A is a cross-section view of the shifting assembly, with the disconnect in the first disconnect position where the disconnect is disengaged with the input hub, and the apply plate is in the first plate position where the plurality of clutch plates are in the engaged position;

FIG. 8 is a flowchart of a method of operating the shifting system, with the method directed toward shifting transmittance of torque between the first and second gear ratios.

DETAILED DESCRIPTION OF THE INVENTION

Figure 1A:
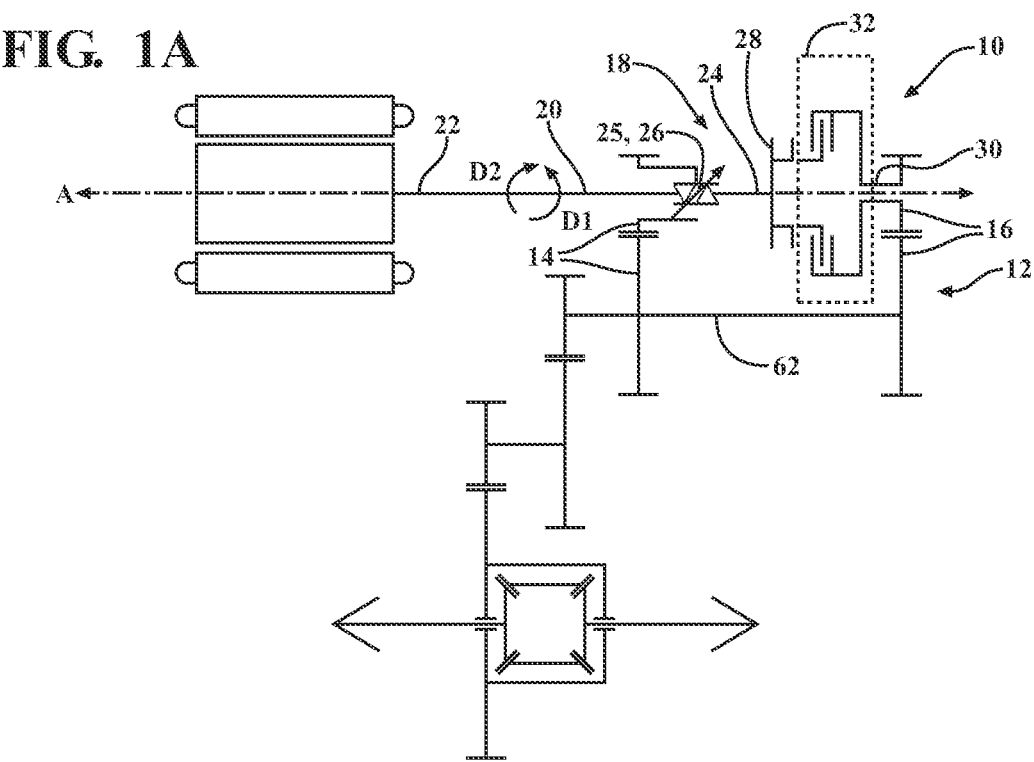
FIG. 1A is a schematic illustration of a vehicle transmission including a shifting system having an electric motor, an input member, a selectable one-way clutch rotatably coupled to and disposed about the input member for selectively transmitting torque through a first gear ratio, and a shifting assembly coupled to the input member for selectively transmitting torque through a second gear ratio.

With reference to the Figures, wherein like numerals indicate like parts throughout the several views, a vehicle transmission 10 is provided in schematic illustration in FIGS. 1A-2B. The vehicle transmission 10 has a gearset 12 including a first gear ratio 14 and a second gear ratio 16 different from the first gear ratio 14. A shifting system 18 for the vehicle transmission 10 is shown in FIGS. 1A-2B.

The shifting system 18 includes an input member 20 extending along an axis A between a first end 22 and a second end 24 spaced from the first end 22. The input member 20 is rotatable about the axis A. As non-limiting examples, the input member 20 may be a shaft or a gear. The shifting system 18 also includes a selectable one-way clutch 26 rotatably coupled to the input member 20, and the selectable one-way clutch 26 is moveable between a first clutch position (denoted as X/X in FIG. 3), a second clutch position (denoted as X/O in FIG. 3), and a third clutch position (denoted as O/O in FIG. 3).

Figure 3:
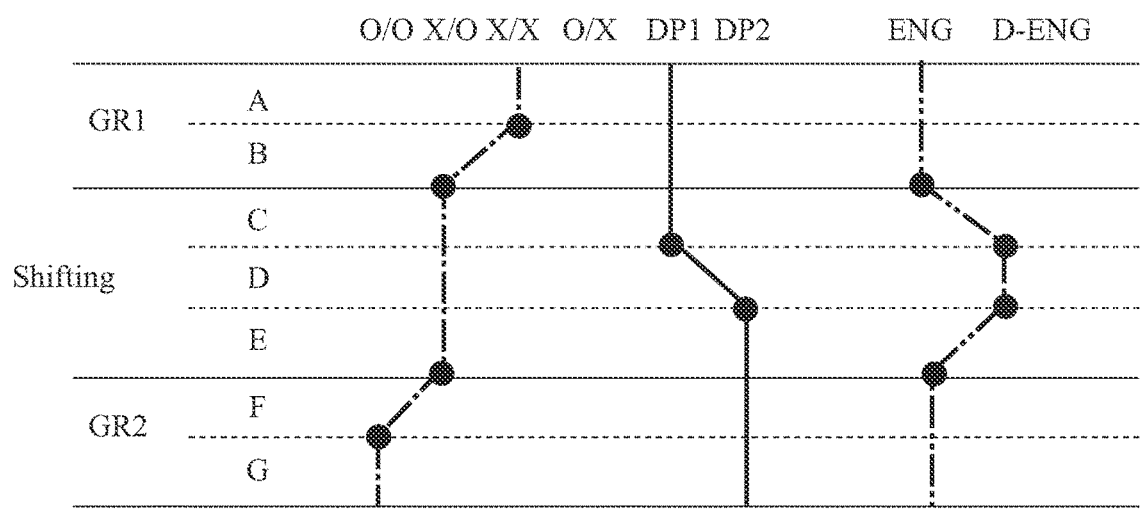
FIG. 3 is a schematic illustration of a shifting schedule for the shifting system of the vehicle transmission, with X/X denoting a first clutch position, X/O denoting a second clutch position, O/O denoting a third clutch position, O/X denoting a fourth clutch position, DP1 denoting a first disconnect position, DP2 denoting a second disconnect position, ENG denoting an engaged position of clutch plates of the shifting assembly, and D-ENG denoting a disengaged position of the clutch plates.

In the first clutch position X/X, as shown in FIG. 3, the selectable one-way clutch 26 is configured to allow torque to be transmitted through one of the first and second gear ratios 14, 16 of the gearset 12 from the input member 20 in either a first rotational direction D1 or a second rotational direction D2 opposite the first rotational direction. In the first clutch position X/X, the selectable one-way clutch 26 is in a lock/lock configuration. In this lock/lock configuration, torque may be transmitted from the input member 20 through one of the first and second gear ratios 14, 16 in the first rotational direction D1. It is also to be appreciated that torque may be transmitted through one of the first and second gear ratios 14, 16 to the input member 20 in the second rotational direction D2. In other words, in the first clutch position X/X, torque may be transmitted in either the first rotational direction D1, or the second rotational direction D2. It is to be appreciated that the first rotational direction D1 may be clockwise, and the second rotational direction D2 may be counterclockwise. Alternatively, it is to be appreciated that the first rotational direction D1 may be counterclockwise, and the second rotational direction D2 may be clockwise.

In the second clutch position X/O, as shown in FIG. 3, the selectable one-way clutch 26 is configured to allow torque to be transmitted through one of the first and second gear ratios 14, 16 of the gearset 12 from the input member 20 in the first rotational direction D1 and prevent torque from being transmitted through one of the first and second gear ratios 14, 16 of the gearset 12 from the input member 20 in the second rotational direction D2. In the second clutch position X/O, the selectable one-way clutch 26 is in a lock/free configuration. In this lock/free configuration, torque may be transmitted from the input member 20 through one of the first and second gear ratios 14, 16 in the first rotational direction D1. However, torque is prevented from being transmitted through one of the first and second gear ratios 14, 16 to the input member 20 in the second rotational direction D2. This lock/free configuration is typically referred to as overrunning the selectable one-way clutch 26 and assists in shifting transmittance of torque from either through the first gear ratio 14 to the second gear ratio 16, or through the second gear ratio 16 to the first gear ratio 14. The second clutch position X/O, therefore, may be referred to as shift ready.

In the third clutch position O/O, as shown in FIG. 3, the selectable one-way clutch 26 is configured to prevent torque from being transmitted through one of the first and second gear ratios 14, 16 of the gearset 12 from the input member 20 in either the first rotational direction D1 or the second rotational direction D2. In the third clutch position O/O, the selectable one-way clutch 26 is in a free/free configuration. In this free/free configuration, torque is prevented from being transmitted from the input member 20 through one of the first and second gear ratios 14, 16 in the first rotational direction D1. In this free/free configuration, torque is also prevented from being transmitted through one of the first and second gear ratios 14, 16 to the input member 20 in the second rotational direction D2. The free/free configuration limits drag losses on the shifting system 18 by rotatably decoupling one of the first and second gear ratios 14, 16 from the input member 20.

The shifting system 18 also includes a disconnect 28 coupled to the input member 20. The disconnect 28 is moveable between a first disconnect position DP1, as shown in FIGS. 3, 5A, 5B, 6A, 6B, 7A, and 7B, and a second disconnect position DP2, as shown in FIGS. 3, 5C, 5D, 6C, 6D, 7C, and 7D. The shifting system 18 includes an output member 30 is spaced from the input member 20, and the output member 30 is selectively rotatable with the input member 20 about the axis A to selectively transmit torque through the other of the first and second gear ratios 14, 16 of the gearset 12.

The shifting system 18 further includes a shifting assembly 32 for selectively rotatably coupling the input member 20 and the output member 30. The shifting assembly 32 includes an input hub 34 coupled to the input member 20. The input hub 34 has a disconnectable component 36 engageable with the disconnect 28, and the disconnectable component 36 of the input hub 34 is disengaged from the disconnect 28 when the disconnect 28 is in the first disconnect position DPI and the disconnectable component 36 of the input hub 34 is engaged with the disconnect 28 when the disconnect 28 is in the second disconnect position DP2.

The disconnect 28 rotatably disconnects the input member 20 and the disconnectable component 36, thus rotatably disconnecting the input member 20 and the input hub 34. In one embodiment, the disconnect 28 is a disconnect clutch. Alternatively, in another embodiment, the disconnect 28 is a synchronizer. In the embodiments where the disconnect 28 is a synchronizer, the synchronizer may have a synchronizer ring, a synchronizer cone, a synchronizer hub, and a synchronizer sleeve. In yet another embodiment, the disconnect 28 is a dog clutch.

The input hub 34 has a clutch engagement component 38. The shifting assembly 32 includes a plurality of clutch plates 40 coupled to the clutch engagement component 38 of the input hub 34. The plurality of clutch plates 40 is moveable between an engaged position ENG and a disengaged position D-ENG. In the engaged position ENG, as shown in FIGS. 3, 5A, 5D, 6A, 6D, 7A, and 7D, the clutch plates 40 are engaged with one another. In the disengaged position D-ENG, as shown in FIGS. 3, 5B, 5C, 6B, 6C, 7B, and 7C, the clutch plates 40 are disengaged from one another. The shifting assembly 32 also includes a clutch plate carrier 42 coupled to the plurality of clutch plates 40 and to the output member 30 to transmit torque from the clutch engagement component 42 of the input hub 34, through the plurality of clutch plates 40 and the clutch plate carrier 42, to the output member 30.

The shifting system 18 results in low drag losses, which increases the efficiency of torque transfer between a motor and the vehicle transmission 10. Moreover, the shifting system 18 produces smooth engagement between the motor and the vehicle transmission 10 through the shifting assembly 32 (i.e., through the connection with the disconnect 28 and engagement of the plurality of clutch plates 40), resulting in fewer vibrations and a more comfortable driving experience. Furthermore, the selectable one-way clutch 26 allows the shifting system 18 to achieve low spin losses by rotatably decoupling the shifting assembly 32 when torque is not required to be transmitted through the shifting assembly 32. The low spin losses allowed by the combination of the selectable one-way clutch 26 and the shifting assembly 32 allow the first and second gear ratios 14, 16 of the vehicle transmission 10 to achieve a net energy savings as compared to a single speed transmission.

It is to be appreciated that the motor may be an internal combustion motor or may be an electric motor. It is also to be appreciated that the motor may be coupled to a back axle of the vehicle. In one embodiment, the motor is the electric motor and is rotatably coupled to the back axle of the vehicle and configured to rotate the back axle of the vehicle to propel the vehicle.

Figure 1B:
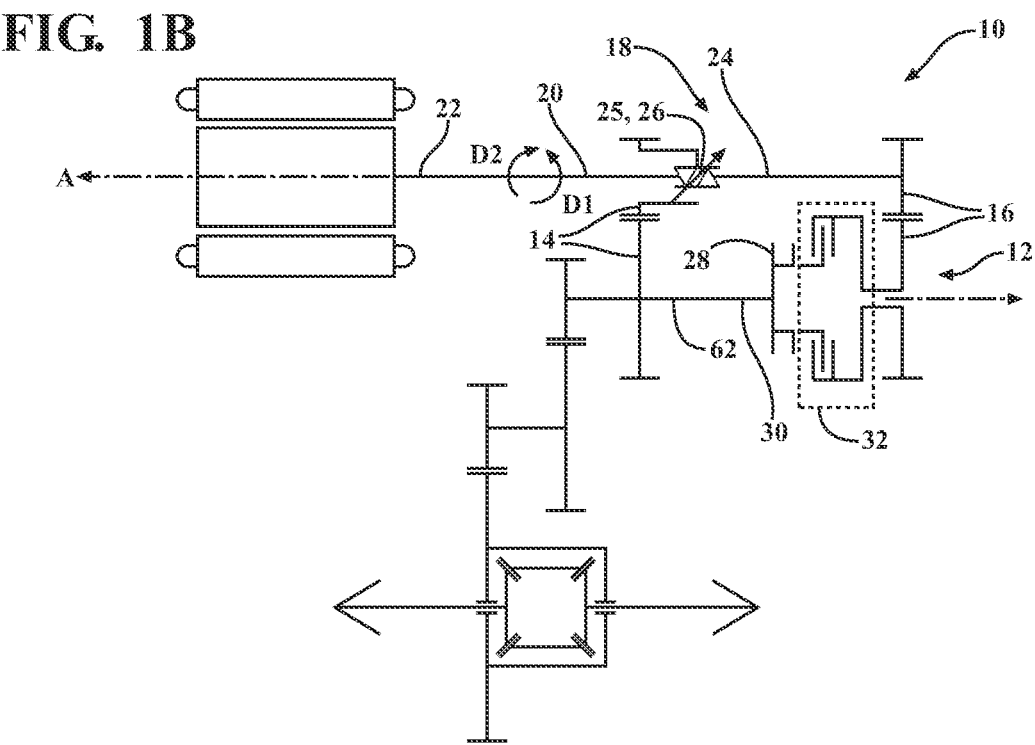
FIG. 1B is a schematic illustration of the vehicle transmission including a countershaft, with the selectable one-way clutch rotatably coupled to the input member and the shifting assembly coupled to the countershaft.
Figure 4A:
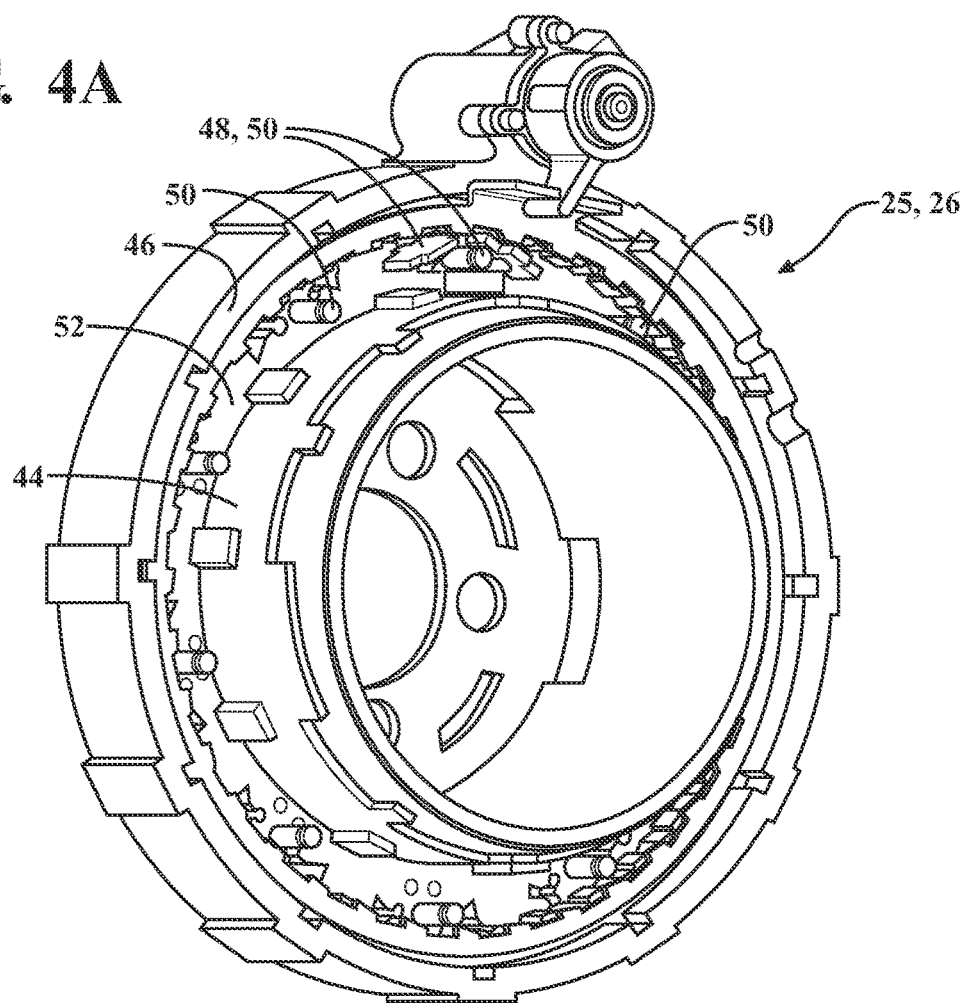
FIG. 4A is a perspective view of the selectable one-way clutch, with the selectable one-way clutch being of the stationary variety and with the selectable one-way clutch having an inner race, an outer race, a plurality of pawls circumferentially spaced from one another, and an actuator ring coupled to the pawls.
Figure 4B:
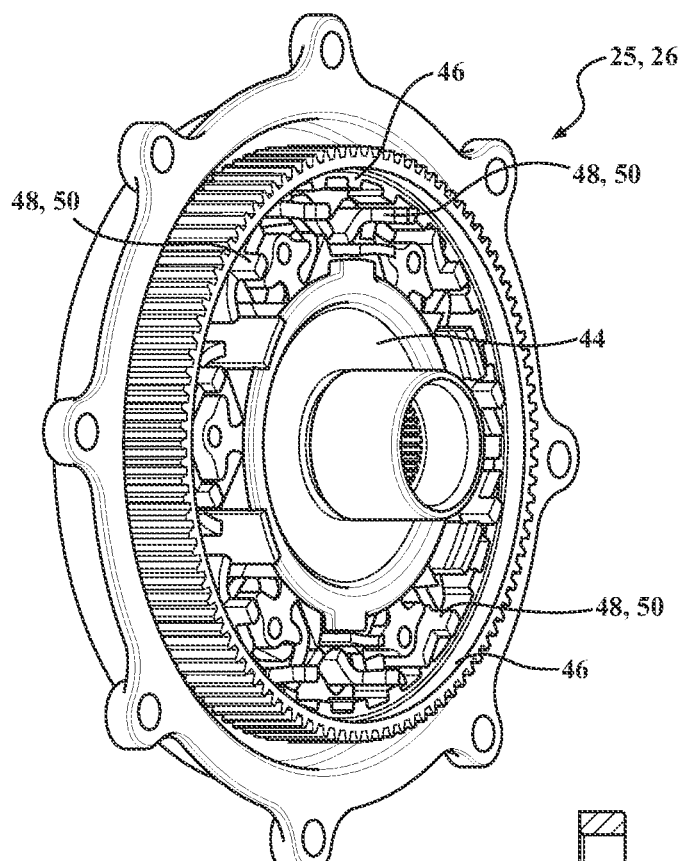
FIG. 4B is a perspective view of the selectable one-way clutch, with the selectable one-way clutch being of the rotating variety.
Figure 4C:
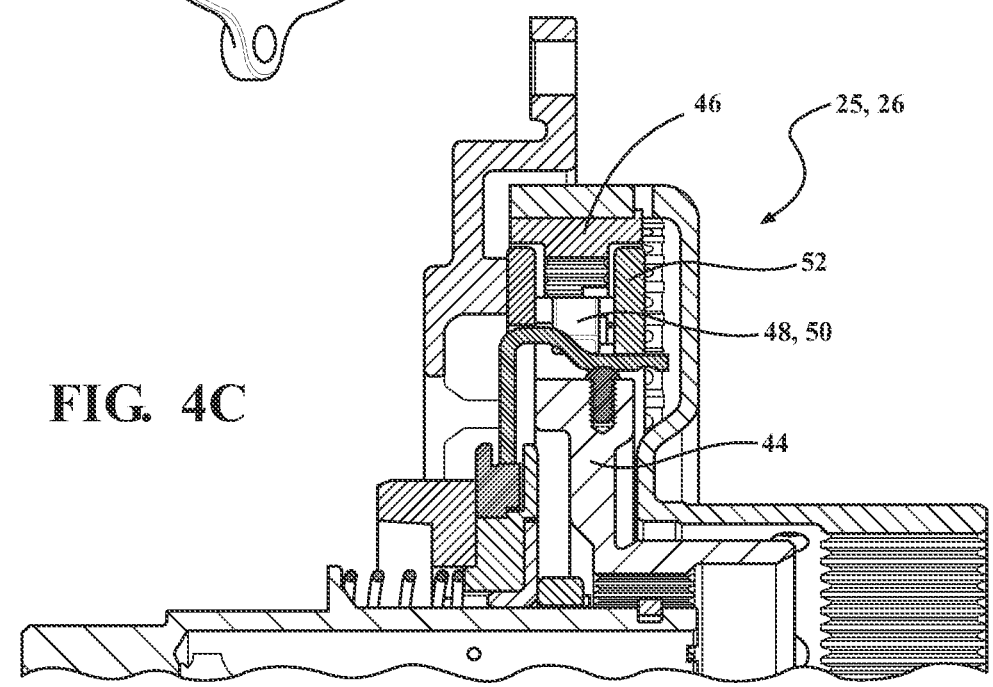
FIG. 4C is a cross-sectional view of the selectable one-way clutch of FIG. 4B.
Figure 5A:
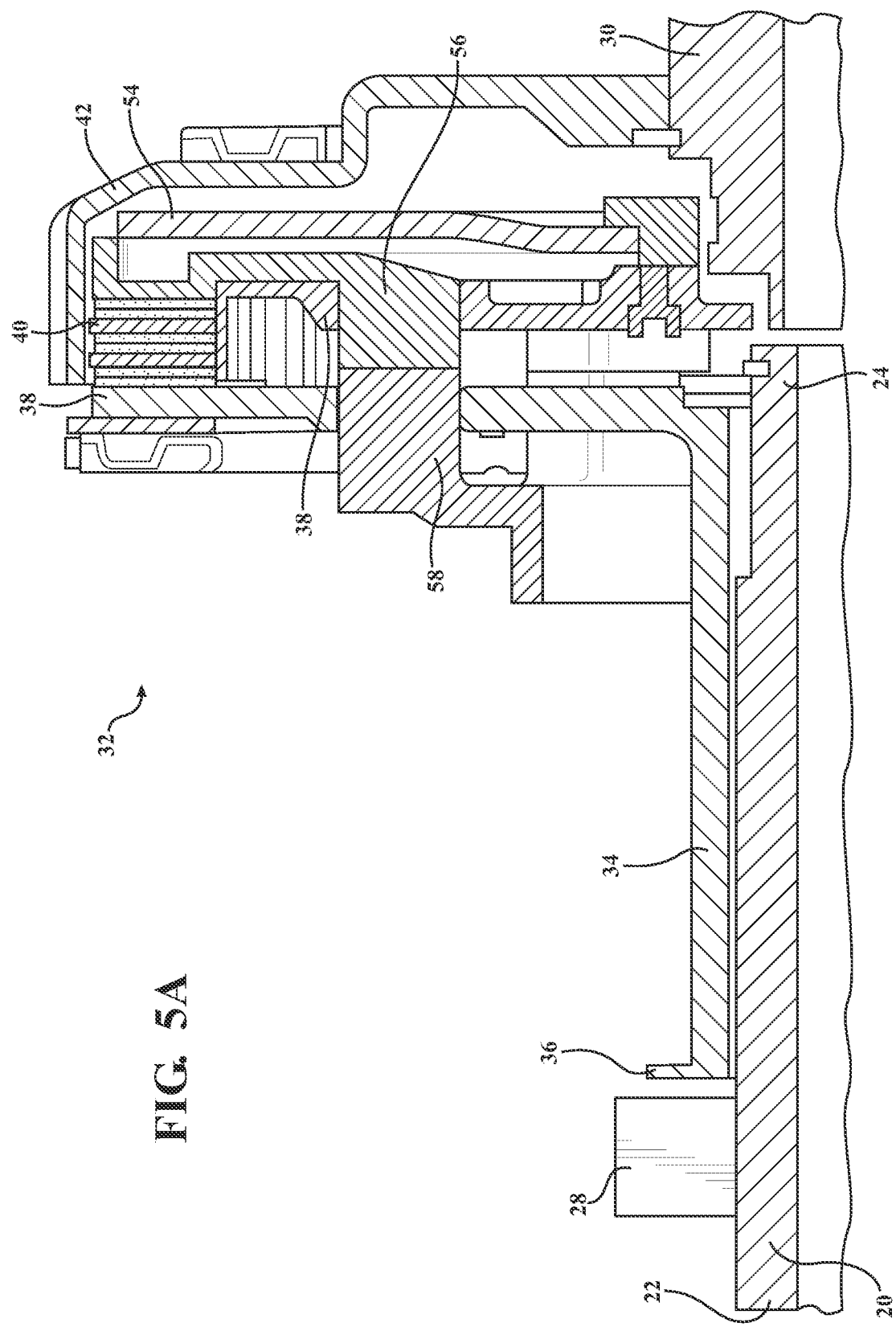
FIG. 5A is a cross-section view of the shifting assembly having an apply plate and a plurality of clutch plates, with the disconnect in the first disconnect position where the disconnect is disengaged with an input hub of the shifting assembly, and the apply plate is in the first plate position where the plurality of clutch plates are in the engaged position.
Figure 5B:
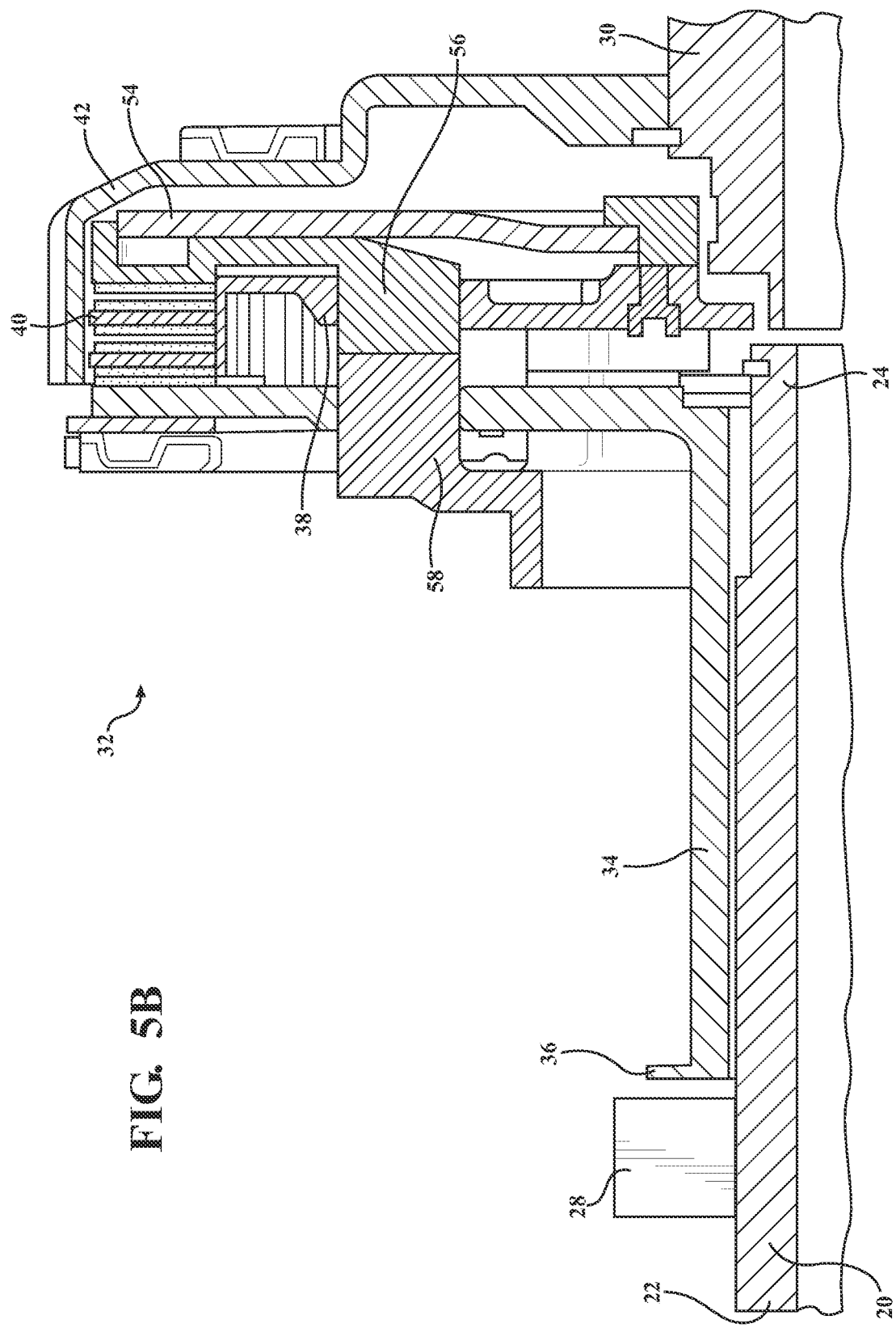
FIG. 5B is a cross-section view of the shifting assembly, with the disconnect in the first disconnect position where the disconnect is disengaged with the input hub, and the apply plate is in the second plate position where the plurality of clutch plates are in the disengaged position.
Figure 5C:
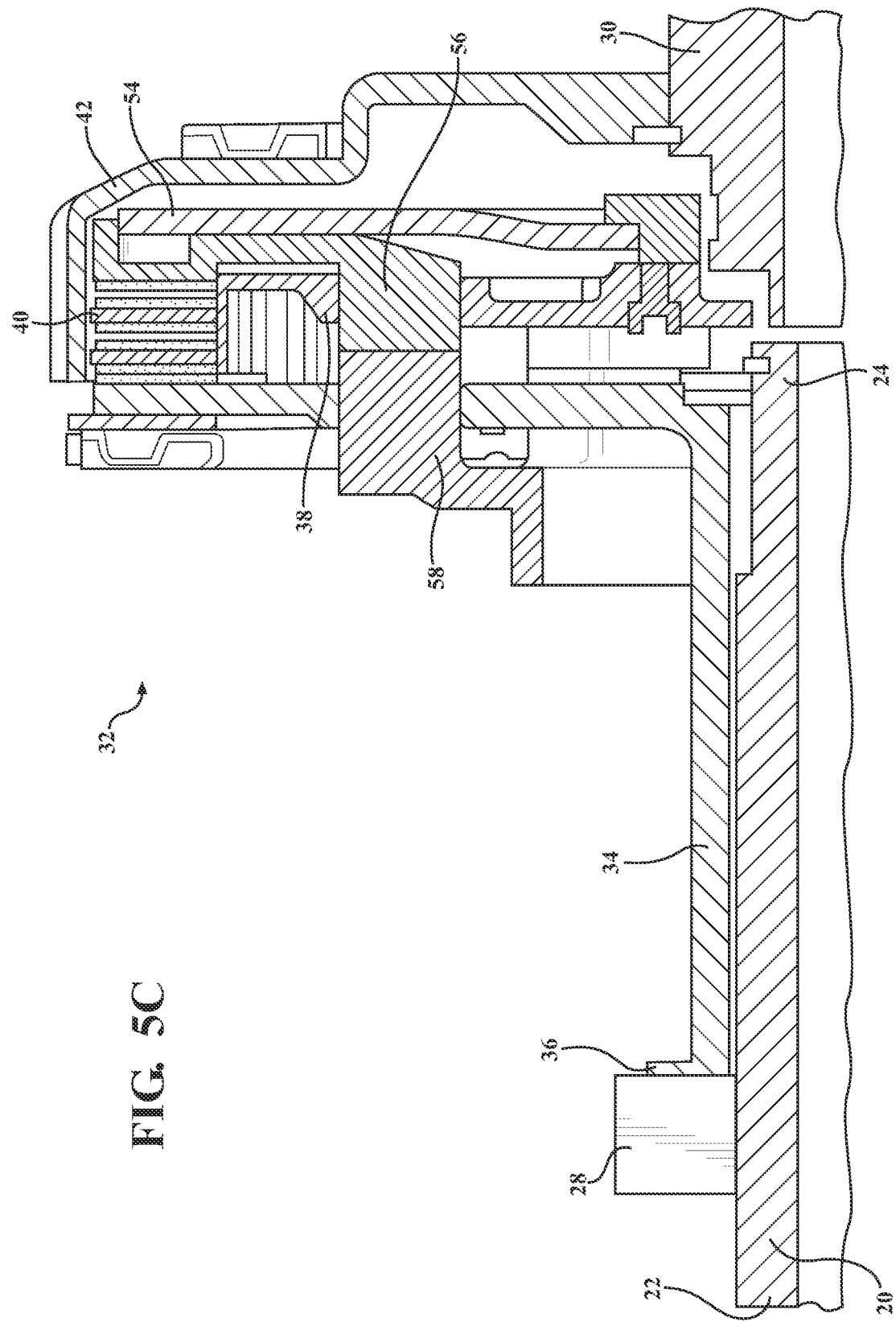
FIG. 5C is cross-sectional view of the shifting assembly, with the disconnect in the second disconnect position where the disconnect is engaged with the input hub, and the apply plate is in the second plate position where the plurality of clutch plates are in the disengaged position.
Figure 5D:
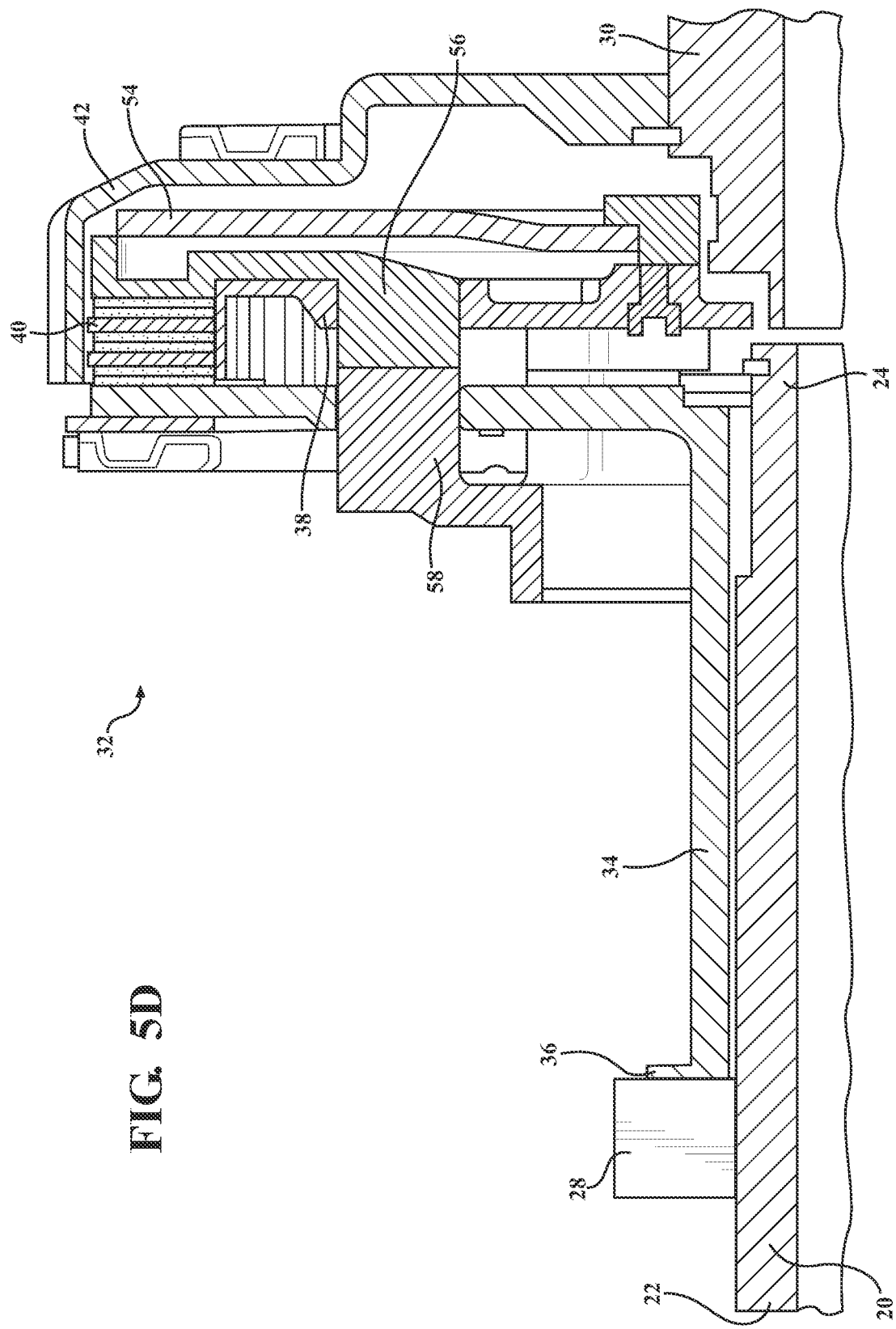
FIG. 5D is a cross-sectional view of the shifting assembly, with the disconnect in the second disconnect position DP2 where the disconnect is engaged with the input hub, and the apply plate is in the first disconnect position where the plurality of clutch plates are in the engaged position.
Figure 6A:
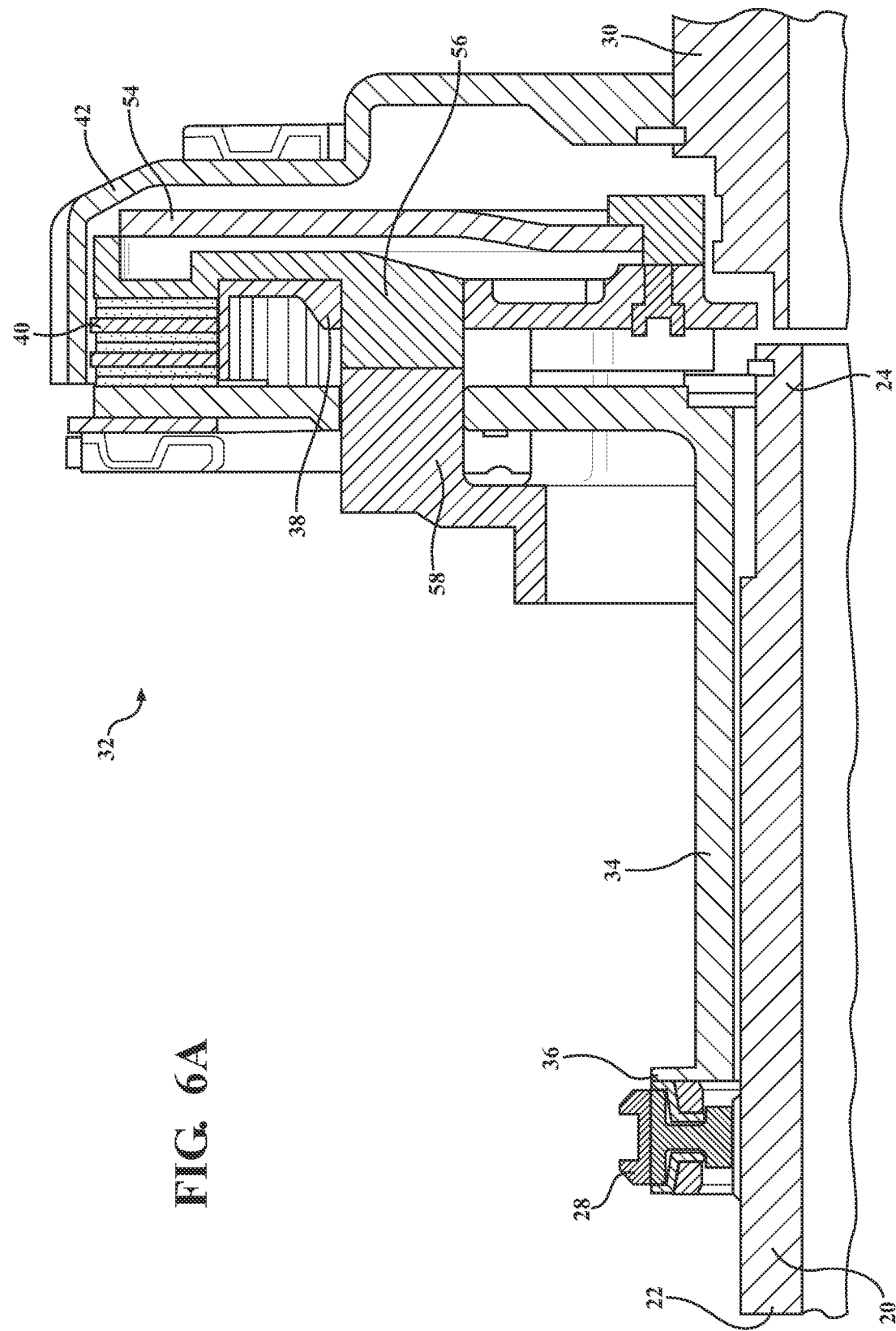
FIG. 6A is a cross-section view of the shifting assembly, with the disconnect being a synchronizer, and with the disconnect in the first disconnect position where the disconnect is disengaged with an input hub, and the apply plate is in the first plate position where the plurality of clutch plates are in the engaged position.
Figure 6B:
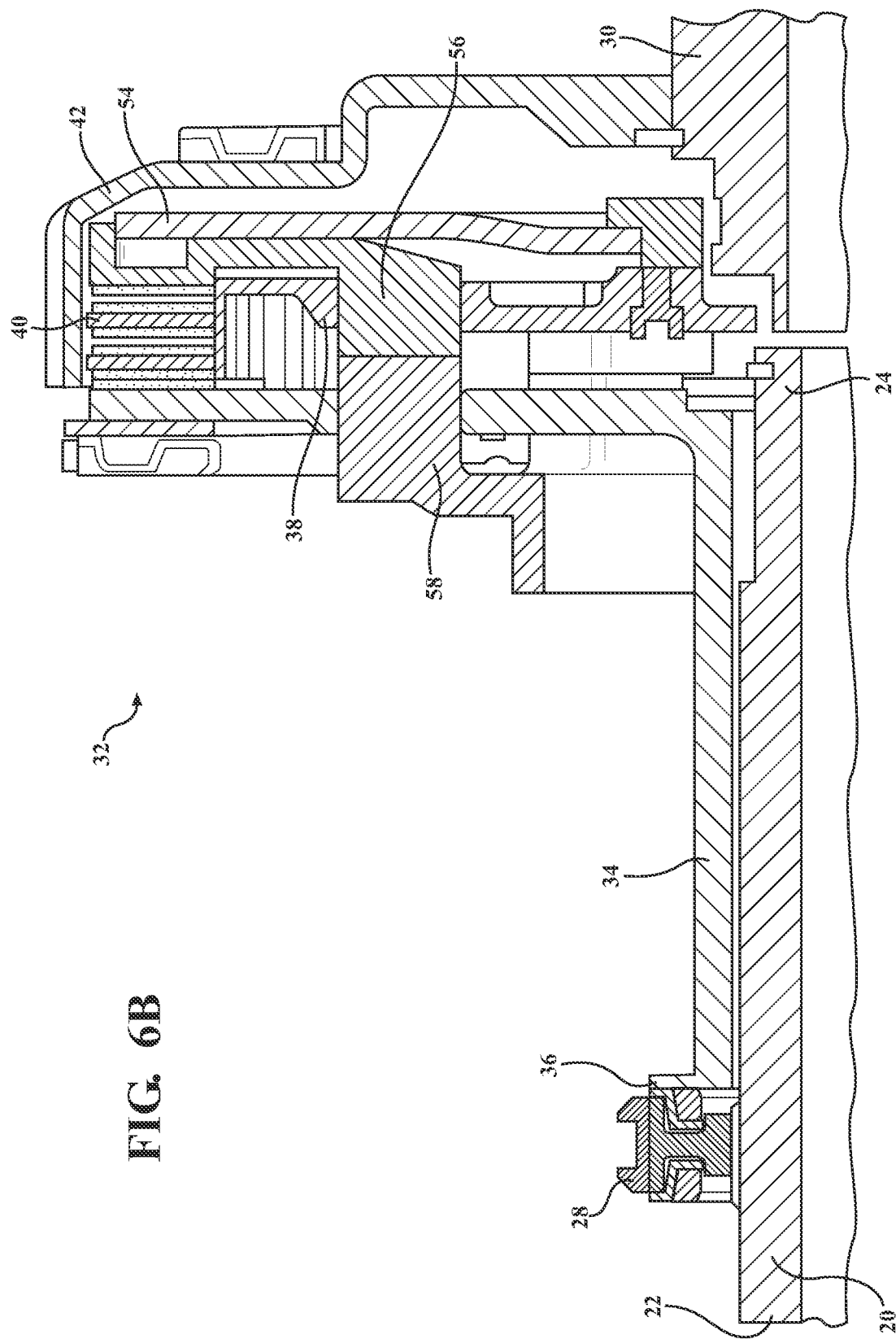
FIG. 6B is a cross-section view of the shifting assembly, with the disconnect being a synchronizer, and with the disconnect in the first disconnect position where the disconnect is disengaged with the input hub, and the apply plate is in the second plate position where the plurality of clutch plates are in the disengaged position.
Figure 6C:
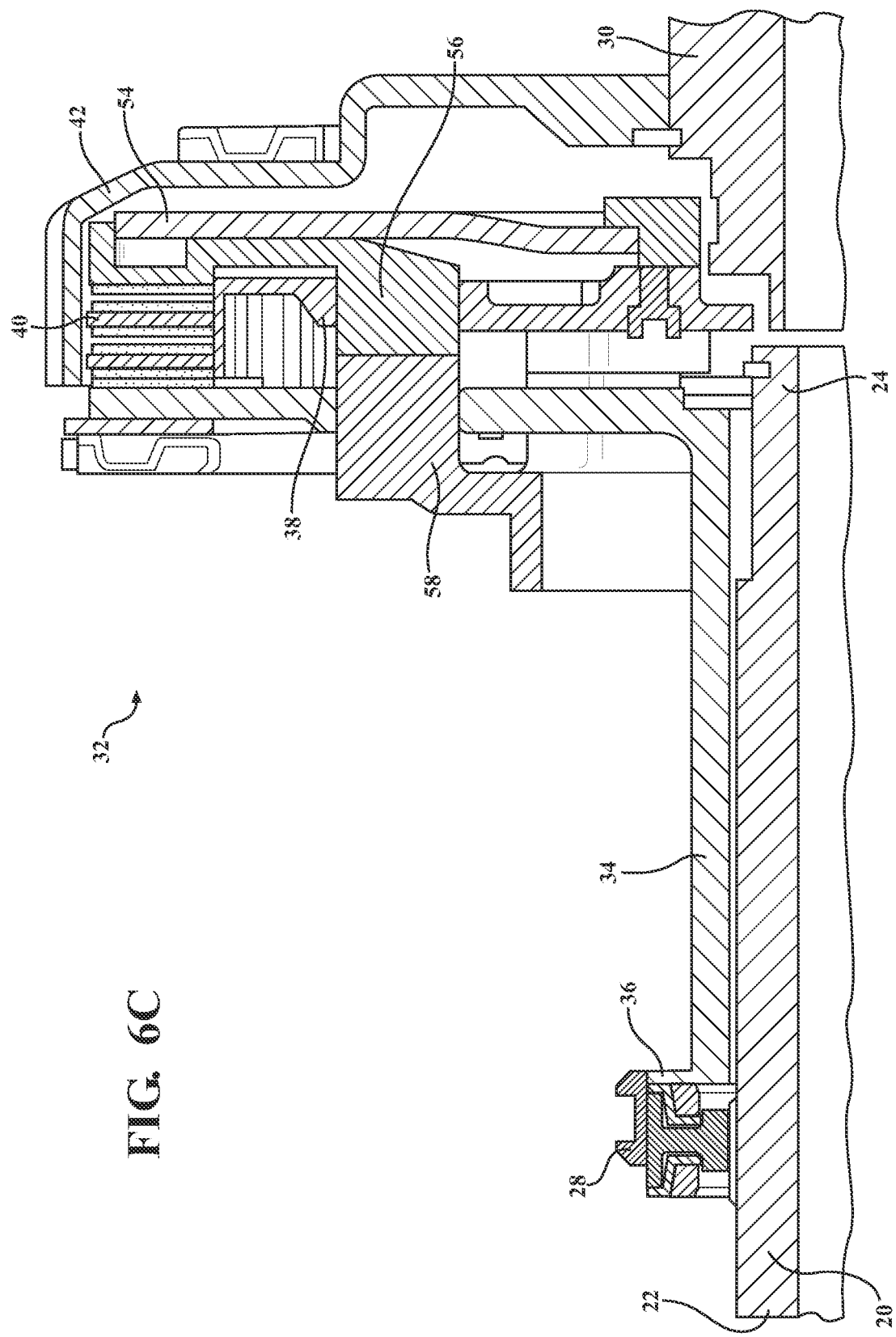
FIG. 6C is a cross-sectional view of the shifting assembly, with the disconnect being a synchronizer, and with the disconnect in the second disconnect position where the disconnect is engaged with the input hub, and the apply plate is in the second plate position where the plurality of clutch plates are in the disengaged position.
Figure 7B:
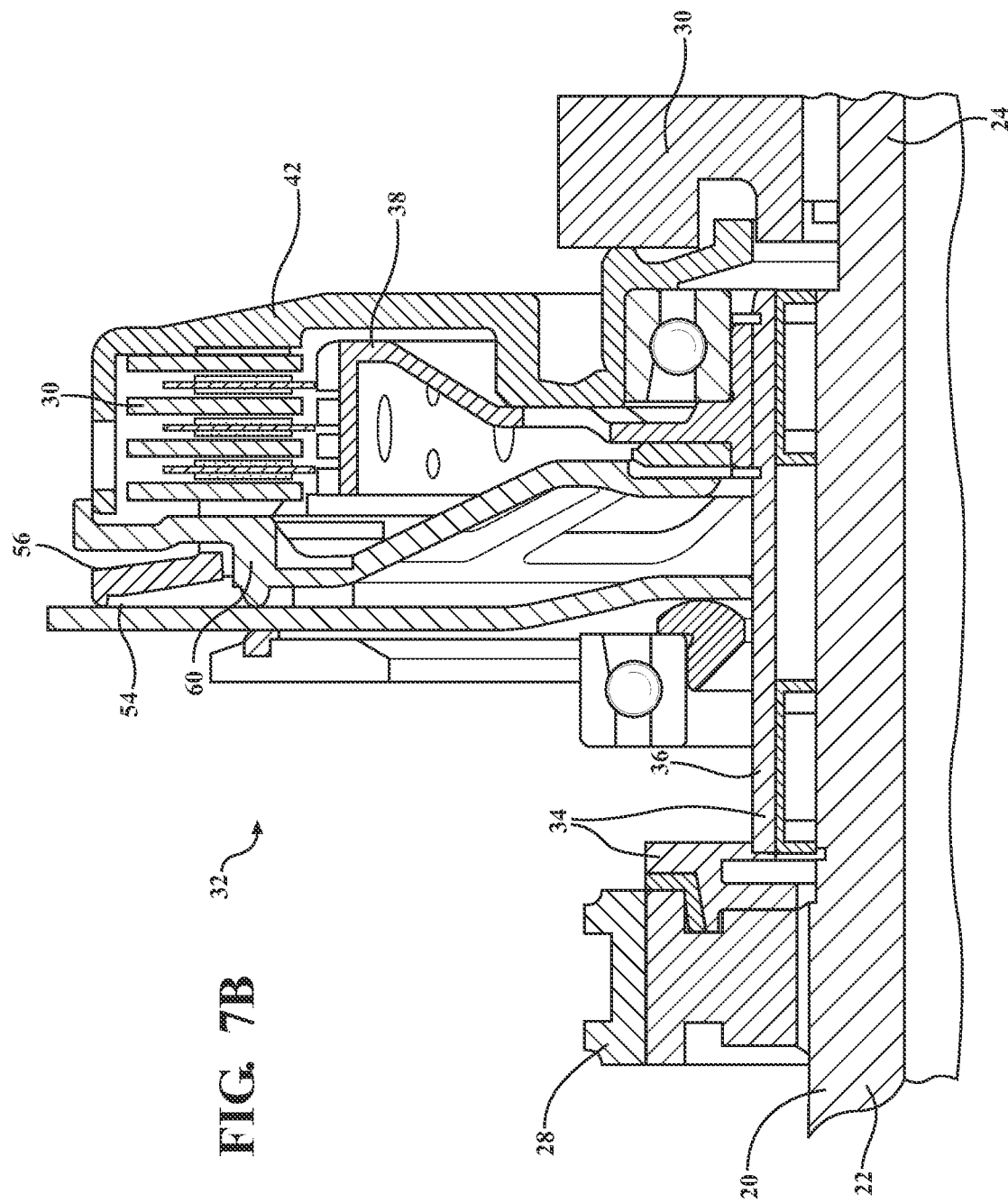
FIG. 7B is a cross-section view of the shifting assembly, with the disconnect in the first disconnect position where the disconnect is disengaged with the input hub, and the apply plate is in the second plate position where the plurality of clutch plates are in the disengaged position.
Figure 7C:
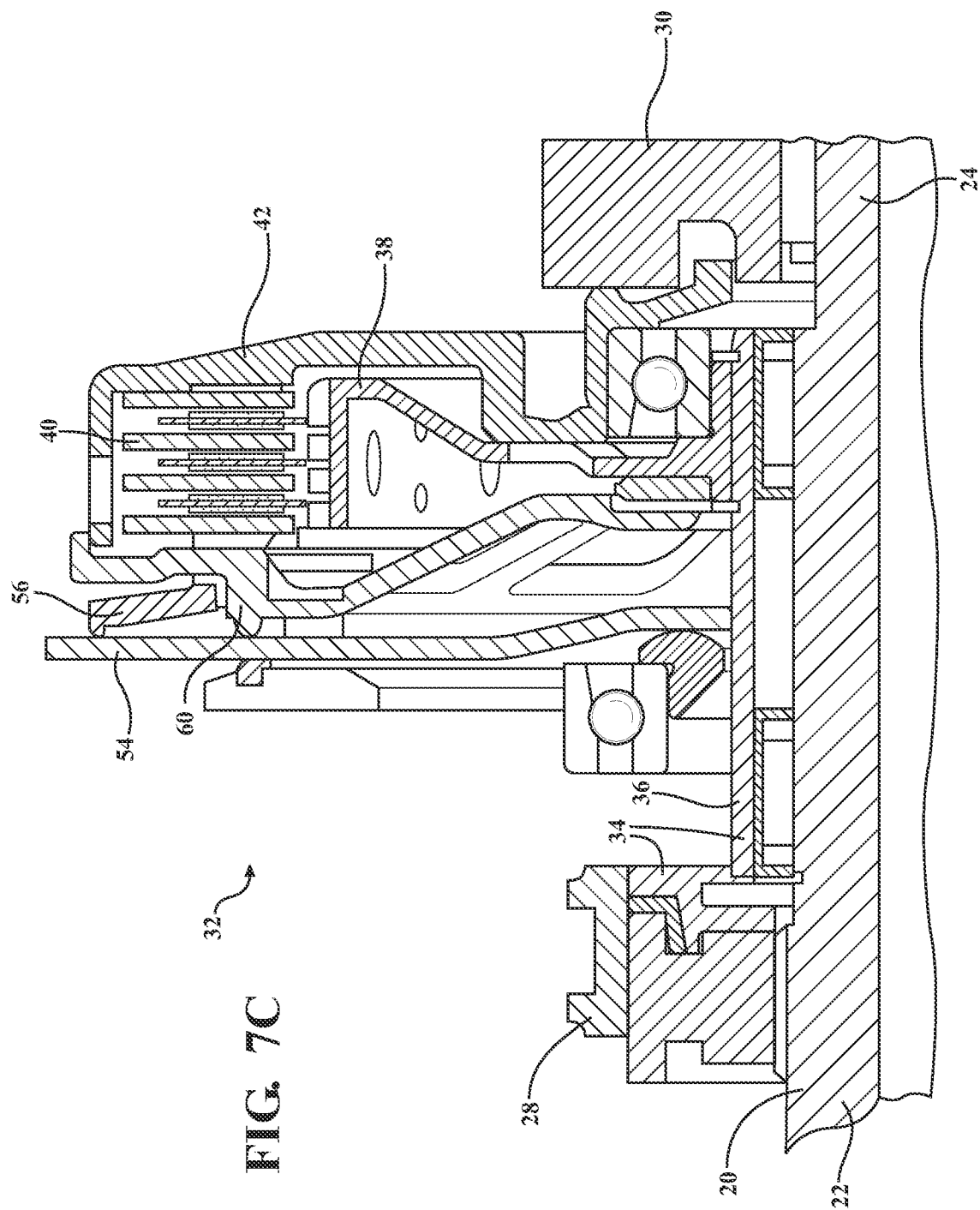
FIG. 7C is a cross-sectional view of the shifting assembly, with the disconnect in the second disconnect position where the disconnect is engaged with the input hub, and the apply plate is in the second plate position where the plurality of clutch plates are in the disengaged position.
Figure 7D:
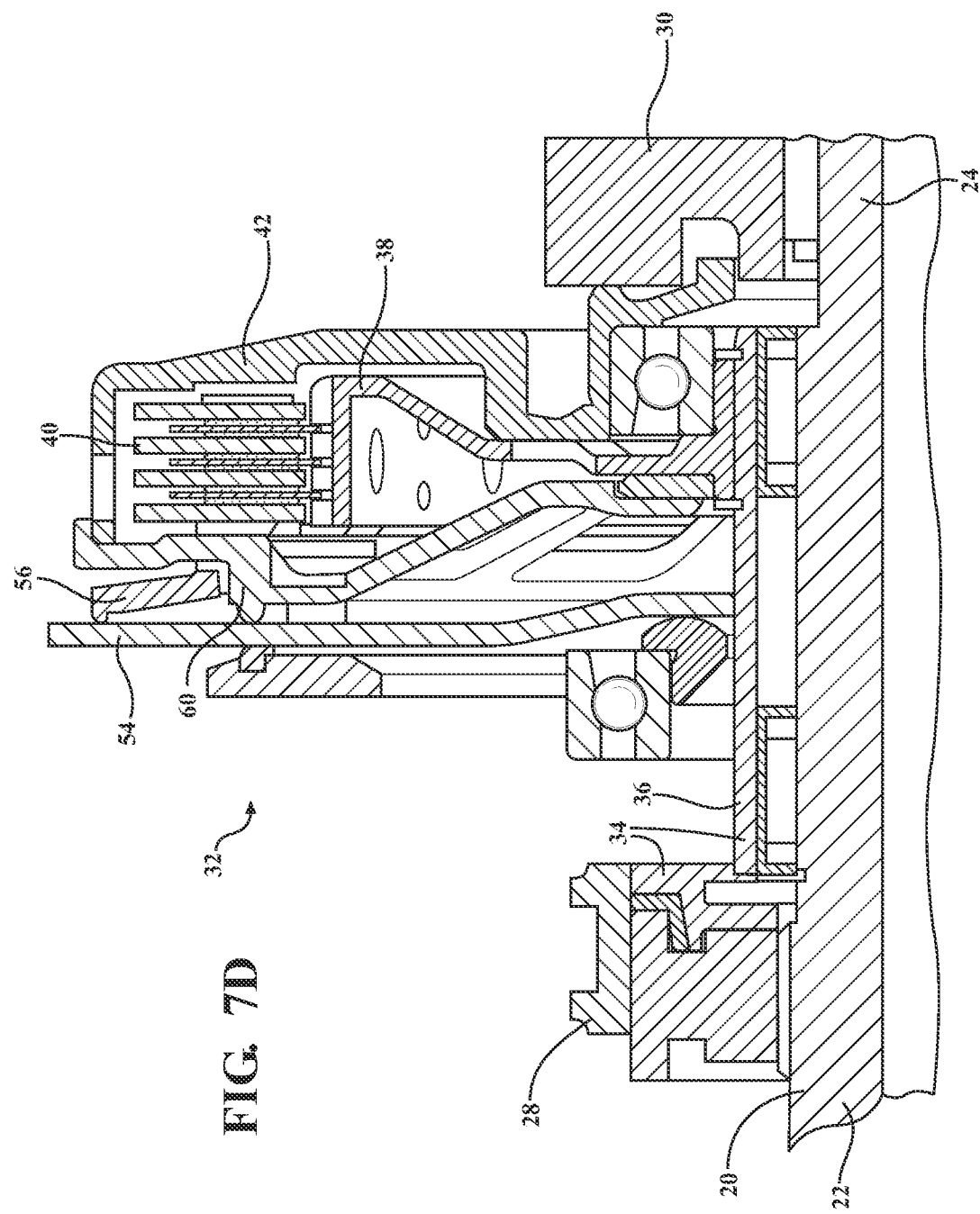
FIG. 7D is a cross-sectional view of the shifting assembly, with the disconnect in the second disconnect position where the disconnect is engaged with the input hub, and the apply plate is in the first disconnect position where the plurality of clutch plates are in the engaged position.

The selectable one-way clutch 26 may have an inner race 44 and an outer race 46 disposed about the inner race 44, as shown in FIGS. 4A-4C. In other words, the inner race 44 and the outer race 46 may be concentric with one another. In one embodiment, as shown in FIGS. 1A and 1B, the inner and outer races 44, 46 of the selectable one-way clutch 26 may be disposed about and aligned axially with the input member 20. The inner race 44 of the selectable one-way clutch 26 may be rotatably coupled with the input member 20. The inner race 44, in a non-limiting example, may be splined to the input member 20 such that rotation of the input member 20 results in rotation of the inner race 44 of the selectable one-way clutch 26. Additionally, or alternatively, the inner race 44 of the selectable one-way clutch 26 may be bolted to, or otherwise mechanically fastened to, the input member 20.

The selectable one-way clutch 26 may also have at least one pawl 48 disposed between the inner race 44 and the outer race 46. The pawl 48 selectively rotatably couples the inner race 44 and the outer race 46. In a non-limiting example, the pawl 48 may be rotatable to engage both the inner race 44 and the outer race 46 to prevent relative rotation between the inner race 44 and the outer race 46. It is to be appreciated that the pawl 48 may allow rotational coupling between the inner race 44 and the outer race 46 in the first rotational direction D1 while preventing rotational coupling between the inner race 44 and the outer race 46 in the second rotational direction D2. Alternatively, it is to be appreciated that the pawl 48 may allow rotational coupling between the inner race 44 and the outer race 46 in the second rotational direction D2 while preventing rotational coupling between the inner race 44 and the outer race 46 in the first rotational direction D1. The pawl 48 may also either prevent, or allow, rotational coupling between the inner race 44 and the outer race 46 in both the first rotational direction D1 and the second rotational direction D2.

The at least one pawl 48 may be further defined as a plurality of pawls 50 circumferentially spaced from one another. The selectable one-way clutch 26 may further include an actuator ring 52 coupled to the plurality of pawls 50 for selectively rotatably locking the inner and outer races 44, 46 together. The actuator ring 52 may be in physical contact with the pawls 50 such that movement, for example rotation, of the actuator ring 52 results in movement, for example rotation, of the pawls 50. The actuator ring 52 may be electrically actuated by a small electric motor or solenoid. The small electric motor or solenoid may be coupled to the outer race 46 of the selectable one-way clutch 26. It is also to be appreciated that the actuator ring 52 may be hydraulically, pneumatically, or otherwise actuated.

The shifting assembly 32 may further include a biasing member 54 coupled to the plurality of clutch plates 40 to bias the plurality of clutch plates 40 toward the engaged position ENG. In other words, the plurality of clutch plates 40 may be normally closed and at rest in the engaged position ENG. Because the plurality of clutch plates 40 of the shifting assembly 32 at rest are in the engaged position ENG due to the biasing member 54 biasing the plurality of clutch plates 40 toward the engaged position ENG, the shifting assembly 32 is energy efficient, and thus the shifting system 18 is also energy efficient. Said differently, because power from an electronic actuator or a hydraulic actuator is not needed to maintain the plurality of clutch plates 40 in the engaged position ENG, the shifting assembly 32 is energy efficient, and thus the shifting system 18 is energy efficient.

The shifting assembly 32 may further include an apply plate 56 coupled to the biasing member 54. The apply plate 56 is moveable between a first plate position where the plurality of clutch plates 40 are in the engaged position ENG, and a second plate position where the apply plate 56 is engaged with the biasing member 54 and the plurality of clutch plates 40 are in the disengaged position D-ENG.

In one embodiment, the apply plate 56 and the disconnect 28 are moveable independent of one another. The apply plate 56 may be moved from the first plate position to the second plate position, resulting in the plurality of clutch plates 40 moving from the engaged position ENG to the disengaged position D-ENG, independent of whether the disconnect 28 is in the first disconnect position DP1 or the second disconnect position DP2 and without affecting the position of the disconnect 28. Likewise, the disconnect 28 may be moved from the first disconnect position DP1 to the second disconnect position DP2, resulting in the input hub 34 being engaged, independent of whether the apply plate 56 is in the first plate position or the second plate position and without affecting the position of the apply plate 56.

In the embodiment where the apply plate 56 and the disconnect 28 are movable independent of one another, the shifting system 18 may also include a first actuator coupled to the disconnect 28 to move the disconnect 28 from the first disconnect position DP1 to the second disconnect position DP2 independent of the apply plate 56, and a second actuator coupled to the apply plate 56 to move the apply plate 56 from the first plate position to the second plate position independent of the disconnect 28. It is to be appreciated that the first and second actuators may be moved through, but not limited to, mechanical actuation, electrical actuation, hydraulic actuation, or pneumatic actuation.

In some embodiments, the input member 20 is rotatably coupled to the output member 30 when the disconnect 28 is in the second disconnect position DP2 and the apply plate 56 is in the first plate position. In other words, the input member 20 may be rotatably coupled to the output member 30 when the apply plate 56 is in the first plate position where the biasing member 54 is able to bias the plurality of clutch plates 40 toward the engaged position ENG, and when the disconnect 28 is in the second disconnect position DP2 where the disconnect 28 is engaged with the input hub 34. In these positions, torque is able to be transmitted from the input member 20, through the input hub 34, the plurality of clutch plates 40, and the clutch plate carrier 42 to the output member 30.

In some embodiments, the input member 20 is rotatably decoupled from the output member 30 when the disconnect 28 is in the first disconnect position DP1 and/or when the apply plate 56 is in the second plate position. In other words, the input member 20 is rotatably decoupled from the output member 30 when either the disconnect 28 is in the first disconnect position DP1, the apply plate 56 is in the second plate position, or both the disconnect 28 is in the first disconnect position DP1 and the apply plate 56 is in the second plate position. In these positions, torque is unable to be transferred from the input member 20 to the output member 30.

The disconnect 28 and the plurality of clutch plates 40 are disposed in series with one another in the embodiments where the input member 20 is rotatably coupled to the output member 30 only when the disconnect 28 is in the second disconnect position DP2 and the apply plate 56 is in the first plate position. Said differently, if either the disconnect 28 is in the first disconnect position DP1 where the disconnect 28 is disengaged from the input hub 34, or the apply plate 56 is in the second plate position where the plurality of clutch plates 40 are disengaged, then the input member 20 is rotatably decoupled from the output member 30. Therefore, when disposed in series, both the disconnect 28 must be engaged with the input hub 34 and the plurality of clutch plates 40 must be engaged with one another to transfer torque directly from the input member 20 to the output member 30.

The disconnectable component 36 of the input hub 34 and the clutch engagement component 42 of the input hub 34 may be integral with one another. Alternatively, the disconnectable component 36 of the input hub 34 and the clutch engagement component 42 of the input hub 34 may be separate components. In some embodiments, the clutch engagement component 42 of the input hub 34 may be rotatably connected to the disconnectable component 36 of the input hub 34 through use of keys, tabs, or bolts. It is to be appreciated that the input hub 34 may be more than two components, and may include a third component or more to transmit torque from the input member 20 to the plurality of clutch plates 40.

In some embodiments, as shown in FIGS. 5A-6D, the shifting assembly 32 further includes an intermediate apply plate 58 coupled to the apply plate 56 such that the apply plate 56 is disposed between the intermediate apply plate 58 and the biasing member 54. The apply plate 56 is contactable by the intermediate apply plate 58 in the first plate position to engage the plurality of clutch plates 40. In this embodiment, the intermediate apply plate 58 transmits force to the apply plate 56, and thus to the biasing member 54, to move the biasing member 54 and result in the plurality of clutch plates 40 being in the disengaged position D-ENG. It is to be appreciated that the intermediate apply plate 58 may also be commonly referred to as a release plate.

Although not required, the shifting assembly 32 may also include a support ring 60 disposed between the biasing member 54 and the clutch engagement component 42 to support the plurality of clutch plates 40. The support ring 60 may be disposed about the axis A, and may be rotatable with either the input member 20 or the output member 30. The support ring 60 may be spaced from the plurality of clutch plates 40 along the axis A, as shown in FIGS. 7A-7D, and may be rotatably coupled to the clutch plate carrier 42.

In some embodiments, as shown in FIGS. 7A-7D, the biasing member 54 is spaced from the clutch engagement component 42 of the input hub 34 and the clutch plate carrier 42 along the axis A such that the clutch engagement component 42 of the input hub 34 is disposed between the biasing member 54 and the clutch plate carrier 42. In this embodiment, the support ring 60 is disposed between the biasing member 54 and the plurality of clutch plates 40, is disposed between the biasing member 54 and the clutch engagement component 42 of the input hub 34.

In other embodiments, as shown in FIGS. 7A-7D, the clutch engagement component 42 of the input hub 34 is spaced from the biasing member 54 and the clutch plate carrier 42 along the axis A such that the biasing member 54 is disposed between the clutch engagement component 42 of the input hub 34 and the clutch plate carrier 42. In this embodiment, the support ring 60 is disposed between the biasing member 54 and the clutch engagement component 42.

In some embodiments, the biasing member 54 is a Belleville spring. It is to be appreciated, however, that the biasing member 54 may be any type of spring, including, but not limited to, a wave spring, a coil spring, and a conical spring.

As shown in FIGS. 5A-6D, the output member 30 may be spaced from the input member 20 along the axis A. In the embodiments where the output member 30 is spaced from the input member 20 along the axis A, the input member 20 may be a shaft, and the output member 30 may also be a shaft. In this embodiment, the output member 30 may be the sole output of the shifting system 18.

It is to be appreciated that in the embodiments illustrated in FIGS. 5A-6D, the apply plate 56 may translate along the axis from the first plate position to the second plate position to translate the biasing member 54 along the axis. In doing so, the plurality of clutch plates 40 is moved from the engaged position ENG to the disengaged position D-ENG.

As shown in FIGS. 7A-7D, the output member 30 may be radially spaced from and disposed about the input member 20. In the embodiments where the output member 30 is radially spaced from and disposed about the input member 20, the output member 30 may be one of at least two outputs of the shifting system 18. Another output other than the output member 30 itself may be the input member 20. Said differently, if the disconnect 28 is in the first disconnect position DPI or the apply plate 56 is in the second plate position, the input member 20 may still be able to transfer torque. It is to be appreciated that the output member 30 may be a gear in the embodiments where the output member 30 is radially spaced from and disposed about the input member 20.

It is to be appreciated that in the embodiments illustrated in FIGS. 7A-7D, the biasing member 54 may pivot about a pivot point of the biasing member 54 when a section of the apply plate 56 closest to the input member 20 is translated along the axis A. In doing so, a section of the apply plate 56 furthest from the input member 20 is moved away from the plurality of clutch plates 40, and the plurality of clutch plates 40 is moved from the engaged position ENG to the disengaged position D-ENG. It is to be appreciated that the pivot point at which the biasing member 54 may pivot is shown where the support ring 60 and an additional backing plate both contact the biasing member 54. The areas of contact of the support ring 60 and additional backing plate where the support ring 60 and/or the additional backing plate contact the biasing member 54 may be hardened against wear.

In some embodiments, the selectable one-way clutch 26 is further moveable to a fourth position, as shown in FIG. 3, where the selectable one-way clutch 26 is configured to allow torque to be transmitted through one of the first and second gear ratios 14, 16 of the gearset 12 from the input member 20 in the second rotational direction D1 and prevent torque from being transmitted through one of the first and second gear ratios 14, 16 of the gearset 12 from the input member 20 in the first rotational direction D1. The selectable one-way clutch 26, in these embodiments, is typically referred to as a four-mode clutch. It is also to be appreciated that the selectable one-way clutch 26 may also be referred to as a multi-mode clutch module. An example of a multi-mode clutch module is described in U.S. Pat. No. 9,151,345 (filed on Jun. 2, 2014 and issued on Oct. 6, 2015) and U.S. Pat. No. 9,726,236 (filed on Jan. 27, 2014 and issued on Aug. 8, 2017), the disclosures of which are both incorporated by reference in their entirety.

In the embodiments where the selectable one-way clutch 26 is moveable to a fourth clutch position (denoted as O/X in FIG. 3), the shifting system 18 may allow regeneration of the electric motor. More specifically, the shifting system 18 may allow regenerative braking. Torque may be transferred from one of the first and second gear ratios 14, 16 through the selectable one-way clutch 26 in the fourth clutch position O/X, and/or the shifting assembly, to the electric motor. In this instance, the electric motor may be a generator which converts rotational movement of the input member 20 to electrical energy.

The vehicle transmission may also include a countershaft 62 spaced from the input member 20 and rotatable about the axis A. It is to be appreciated that the countershaft 62 may also be referred to as a layshaft 62. The selectable one-way clutch 26 may be configured to transmit torque from the input member 20 to the countershaft 62 through the first gear ratio 14. The shifting assembly 32 may be configured to transmit torque from the output member 30 to the countershaft 62 through the second gear ratio 16. It is to be appreciated that the output member 30 may be a shaft, a gear, or even the countershaft 62 itself.

It is to be appreciated that the inner and outer races 44, 46 of the selectable one-way clutch 26 may be disposed about and aligned axially with the input member 20, as shown in FIGS. 1A and 1B. It is also to be appreciated that, in the embodiments where the inner and outer races 44, 46 of the selectable one-way clutch 26 is disposed about and aligned axially with the input member 20, the shifting assembly 32 may either be coupled to the input member 20, as shown in FIG. 1A, or coupled to the countershaft 62, as shown in FIG. 1B.

Figure 2A:
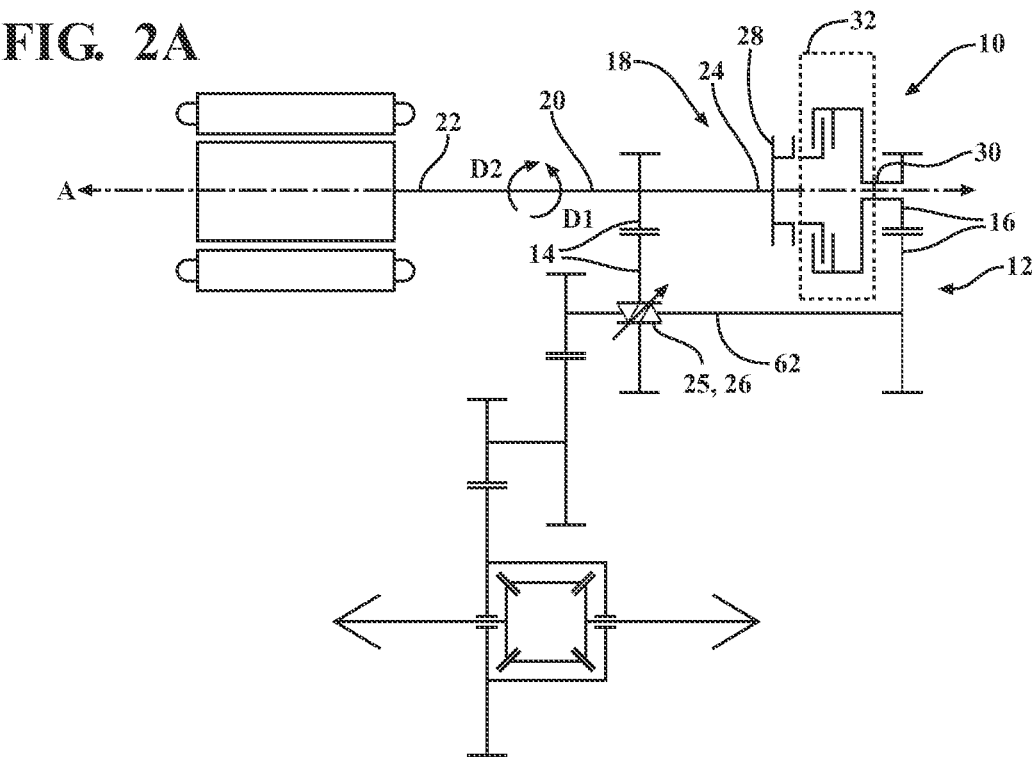
FIG. 2A is a schematic illustration of the vehicle transmission, with the selectable one-way clutch rotatably coupled to and disposed about the countershaft and the shifting assembly coupled to the input member.
Figure 2B:
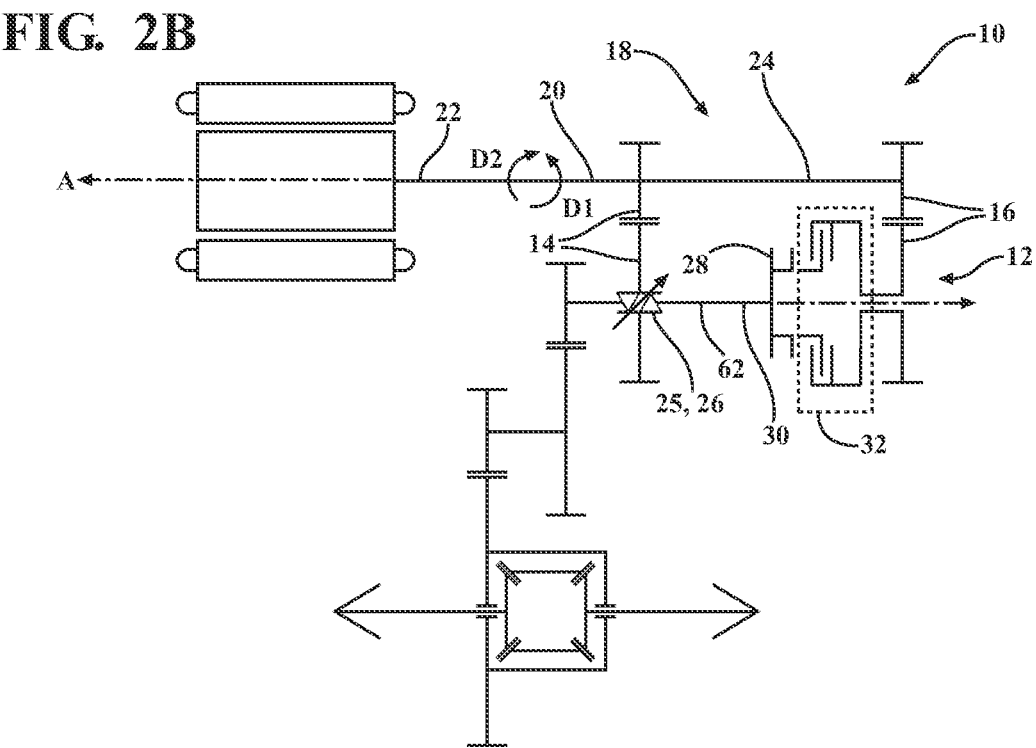
FIG. 2B is a schematic illustration of the vehicle transmission, with the selectable one-way clutch rotatably coupled to and disposed about the countershaft and the shifting assembly coupled to the countershaft.

In another embodiment, as shown in FIGS. 2A and 2B, the inner and outer races 44, 46 of the selectable one-way clutch 26 are disposed about and aligned axially with the countershaft 62. In this embodiment, the input member 20 extends directly from the motor to the shifting assembly 32. However, it is to be appreciated that the input member 20 may be solid, unitary, and one-piece in either, or both, embodiments where the selectable one-way clutch 26 is disposed about and aligned axially with either the input member 20 or the countershaft 62. It is also to be appreciated that, in the embodiments where the inner and outer races 44, 46 of the selectable one-way clutch 26 is disposed about and aligned axially with the countershaft 62, the shifting assembly 32 may either be coupled to the input member 20, as shown in FIG. 2A, or coupled to the countershaft 62, as shown in FIG. 2B.

A method of operating the shifting system 18 is also provided. The method includes the step of moving the selectable one-way clutch 26 from the first clutch position X/X where the selectable one-way clutch 26 is configured to allow torque to be transmitted through one of the first and second gear ratios 14, 16 from the input member 20 in either the first rotational direction D1 or the second rotational direction D2 opposite the first rotational direction, to the second clutch position X/O where the selectable one-way clutch 26 is configured to allow torque to be transmitted through one of the first and second gear ratios 14, 16 from the input member 20 in the first rotational direction D1 and prevent torque from being transmitted through one of the first and second gear ratios 14, 16 from the input member 20 in the second rotational direction D2. The step of moving the selectable one-way clutch 26 from the first clutch position X/X to the second clutch position X/O is indicated by a shifting schedule in FIG. 3, particularly by elements A and B.

The method also includes moving the plurality of clutch plates 40 from the engaged position ENG, where the clutch plates 40 are engaged with one another, to the disengaged position D-ENG, where the clutch plates 40 are disengaged from one another. The step of moving the clutch plates 40 from the engaged position ENG to the disengaged position D-ENG is indicated by the shifting schedule in FIG. 3, particularly by element C.

The method further includes the step of moving the disconnect 28 from the first disconnect position DP1, where the disconnectable component 36 of the input hub 34 is disengaged from the disconnect 28, to the second disconnect position DP2, where the disconnectable component 36 of the input hub 34 is engaged with the disconnect 28. The step of moving the disconnect 28 from the first disconnect position DP1 to the second disconnect position DP2 is indicated by the shifting schedule in FIG. 3, particularly by element D.

The method further includes the step of moving the selectable one-way clutch 26 from the second clutch position X/O, to the third clutch position O/O where the selectable one-way clutch 26 is configured to prevent torque from being transmitted through one of the first and second gear ratios 14, 16 from the input member 20 in either the first rotational direction D1 or the second rotational direction D2 to shift the transmittance of torque from the input member 20 through one of the first and second gear ratios 14, 16, to from the input member 20 through the other of the first and second gear ratios 14, 16. The step of moving the selectable one-way clutch 26 from the second clutch position X/O to the third clutch position O/O is indicated by the shifting schedule in FIG. 3, particularly by element F.

In one embodiment, the step of moving the selectable one-way clutch 26 from the first clutch position X/X to the second clutch position X/O precedes the step of moving the plurality of clutch plates 40 from the engaged position ENG to the disengaged position D-ENG. Additionally, the step of moving the plurality of clutch plates 40 from the engaged position ENG to the disengaged position D-ENG may precede the step of moving the disconnect 28 from the first disconnect position DPI to the second disconnect position DP2. In this way, the disconnect 28 may smoothly engage the disconnectable component 36 of the input hub 34 because the clutch plates 40 in the disengaged position D-ENG rotatably decouple the input member 20 from the output member 30.

Moreover, the step of moving the disconnect 28 from the first disconnect position DPI to the second disconnect position DP2 may precede the step of moving the selectable one-way clutch 26 from the second clutch position X/O to the third clutch position O/O. The method may further include the step of moving the plurality of clutch plates 40 from the disengaged position D-ENG to the engaged position ENG, as indicated by the shifting schedule in FIG. 3, particularly by element E. In other words, the clutch plates 40 may be re-engaged. In the embodiments where the clutch plates 40 are normally closed, the step of moving the clutch plates 40 from the engaged position ENG to the disengaged position D-ENG results in the clutch plates being at rest and torque being able to be transmitted through the shifting assembly 32 to the other of the first and second gear ratios 14, 16. In this way, torque is allowed to be transmitted through the shifting assembly 32 by the other of the first and second gear ratios 14, 16. As discussed above, the selectable one-way clutch 26 may then move from the second clutch position X/O to the third clutch position O/O to rotatably decouple the input member 20 from the selectable one-way clutch 26 and prevent torque from being transmitted through one of the first and second gear ratios 14, 16.

The step of moving the disconnect 28 from the first disconnect position DPI to the second disconnect position DP2 may precede the step of moving the plurality of clutch plates 40 from the disengaged position D-ENG to the engaged position ENG. In other words, the disconnect 28 may be engaged with the disconnectable component 36 of the input hub 34 before the clutch plates 40 are re-engaged. Re-engaging the clutch plates 40 after the disconnect 28 is in the second disconnect position DP2 smoothly rotatably couples the input member 20 and the output member 30, thus allowing torque to be transmitted through the other of the first and second gear ratios 14, 16. The shift schedule in FIG. 3 indicated that torque is allowed to be transmitted through one of the first and second gear ratios 14, 16 by element A, and that torque is allowed to be transmitted through the other of the first and second gear ratios 14, 16 by element G.

It is to be appreciated that one of the first and second gear ratios 14, 16, may be either the first gear ratio 14 or the second gear ratio 16. It is also to be appreciated that the other of the first and second gear ratios 14, 16 may be either the first gear ratio 14 or the second gear ratio 16. In other words, the selectable one-way clutch 26 may be configured to transmit torque through the first gear ratio 14 or may be configured to transmit torque through the second gear ratio 16. The shifting assembly 32, therefore, may be configured to transmit torque through the corresponding first gear ratio 14 or second gear ratio 16. In the embodiment where the selectable one-way clutch 26 is configured to transmit torque through the first gear ratio 14, the shifting assembly 32 is configured to transmit torque through the second gear ratio 16. Alternatively, in the embodiment where the selectable one-way clutch is configured to transmit torque through the second gear ratio 16, the shifting assembly 32 is configured to transmit torque through the first gear ratio 14. It is also to be appreciated that the torque multiplication, or torque reduction, through the first gear ratio 14 may be higher than, or may be lower than, through the second gear ratio 16.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A shifting system for a vehicle transmission having a gearset comprising a first gear ratio and a second gear ratio different from the first gear ratio, the shifting system comprising;
    an input member extending along an axis between a first end and a second end spaced from the first end, with said input member rotatable about said axis;
    a selectable one-way clutch rotatably coupled to said input member, with said selectable one-way clutch moveable between,
        a first clutch position where said selectable one-way clutch is configured to allow torque to be transmitted through one of the first and second gear ratios of the gearset from said input member in either a first rotational direction or a second rotational direction opposite said first rotational direction;
        a second clutch position where said selectable one-way clutch is configured to allow torque to be transmitted through one of the first and second gear ratios of the gearset from said input member in said first rotational direction and prevent torque from being transmitted through one of the first and second gear ratios of the gearset from said input member in said second rotational direction; and
        a third clutch position where said selectable one-way clutch is configured to prevent torque from being transmitted through one of the first and second gear ratios of the gearset from said input member in either said first rotational direction or said second rotational direction;
    a disconnect coupled to said input member and moveable between a first disconnect position and a second disconnect position;
    an output member spaced from said input member, said output member selectively rotatable with said input member about said axis to selectively transmit torque through the other of the first and second gear ratios of the gearset; and
    a shifting assembly for selectively rotatably coupling said input member and said output member, said shifting assembly comprising;
        an input hub coupled to said input member, with said input hub having a disconnectable component engageable with said disconnect, where said disconnectable component of said input hub is disengaged from said disconnect when said disconnect is in said first disconnect position and where said disconnectable component of said input hub is engaged with said disconnect when said disconnect is in said second disconnect position, and with said input hub having a clutch engagement component;
        a plurality of clutch plates coupled to said clutch engagement component of said input hub, with said plurality of clutch plates moveable between an engaged position where said clutch plates are engaged with one another, and a disengaged position where said clutch plates are disengaged from one another; and
        a clutch plate carrier coupled to said plurality of clutch plates and to said output member to transmit torque from said clutch engagement component of said input hub through said plurality of clutch plates and said clutch plate carrier to said output member.

2. The shifting system as set forth in claim 1, wherein said selectable one-way clutch has an inner race and an outer race disposed about said inner race.

3. The shifting system as set forth in claim 2, wherein said inner and outer races of said selectable one-way clutch are disposed about and aligned axially with said input member.

4. The shifting system as set forth in claim 2, wherein said inner race of said selectable one-way clutch is rotatably coupled with said input member.

5. The shifting system as set forth in claim 1, wherein said selectable one-way clutch has at least one pawl disposed between said inner race and said outer race.

6. The shifting system as set forth in claim 5, wherein said at least one pawl is further defined as a plurality of pawls circumferentially spaced from one another, and wherein said selectable one-way clutch further comprises an actuator ring coupled to said plurality of pawls for selectively rotatably locking the inner and outer races together.

7. The shifting system as set forth in claim 1, wherein said shifting assembly further comprises a biasing member coupled to said plurality of clutch plates to bias said plurality of clutch plates toward said engaged position.

8. The shifting system as set forth in claim 1, wherein said selectable one-way clutch is further moveable to a fourth position where said selectable one-way clutch is configured to allow torque to be transmitted through one of the first and second gear ratios of the gearset from said input member in said second rotational direction and prevent torque from being transmitted through one of the first and second gear ratios of the gearset from said input member in said first rotational direction.

9. A vehicle transmission comprising;
a gearset comprising a first gear ratio and a second gear ratio different from said first gear ratio;
an input member extending along an axis between a first end and a second end spaced from the first end, with said input member rotatable about said axis;
a selectable one-way clutch rotatably coupled to said input member and configured to allow torque to be transmitted through one of said first and second gear ratios of said gearset, with said selectable one-way clutch moveable between,
  a first clutch position where said selectable one-way clutch is configured to allow torque to be transmitted through one of said first and second gear ratios of said gearset from said input member in either a first rotational direction or a second rotational direction opposite said first rotational direction;
  a second clutch position where said selectable one-way clutch is configured to allow torque to be transmitted through one of said first and second gear ratios of said gearset from said input member in said first rotational direction and prevent torque from being transmitted through one of said first and second gear ratios of said gearset from said input member in said second rotational direction; and
  a third clutch position where said selectable one-way clutch is configured to prevent torque from being transmitted through one of said first and second gear ratios of said gearset from said input member in either said first rotational direction or said second rotational direction;
a disconnect coupled to said input member and moveable between a first disconnect position and a second disconnect position;
an output member spaced from said input member, said output member selectively rotatable with said input member about said axis to selectively transmit torque through the other of said first and second gear ratios of said gearset; and
a shifting assembly to selectively rotatably couple said input member and said output member, said shifting assembly comprising;
  an input hub coupled to said input member, with said input hub having a disconnectable component engageable with said disconnect, where said disconnectable component of said input hub is disengaged from said disconnect when said disconnect is in said first disconnect position and where said disconnectable component of said input hub is engaged with said disconnect when said disconnect is in said second disconnect position, and with said input hub having a clutch engagement component;
  a plurality of clutch plates coupled to said clutch engagement component of said input hub, with said plurality of clutch plates moveable between an engaged position where said clutch plates are engaged with one another, and a disengaged position where said plurality of clutch plates are disengaged from one another; and
  a clutch plate carrier coupled to said plurality of clutch plates and to said output member to transmit torque from said clutch engagement component of said input hub through said plurality of clutch plates and said clutch plate carrier to said output member.

10. The vehicle transmission as set forth in claim 9, wherein said selectable one-way clutch has an inner race and an outer race disposed about said inner race.

11. The vehicle transmission as set forth in claim 10, wherein said inner and outer races of said selectable one-way clutch are disposed about and aligned axially with said input member.

12. The vehicle transmission as set forth claim 9 further comprising a countershaft spaced from said input member and rotatable about said axis, with said selectable one-way clutch configured to transmit torque from said input member to said countershaft through said first gear ratio.

13. The vehicle transmission as set forth in claim 12, wherein said inner and outer races of said selectable one-way clutch are disposed about and aligned axially with said countershaft.

14. The vehicle transmission as set forth in claim 12, wherein said shifting assembly is configured to transmit torque from said output member to said countershaft through said second gear ratio.

15. A method of operating a shifting system for a vehicle transmission having a gearset comprising a first gear ratio and second gear ratio different from the first gear ratio, with the shifting system comprising an input member extending along an axis between a first end and a second end spaced from the first end, with the input member rotatable about the axis, a selectable one-way clutch rotatably coupled to the input member and configured to selectively allow torque to be transmitted through one of the first and second gear ratios of the gearset from the input member, a disconnect coupled to the input member, an output member spaced from the input member, the output member selectively rotatable with the input member about the axis to selectively transmit torque through the other of the first and second gear ratios of the gearset; and a shifting assembly to selectively rotatably couple the input member and the output member, the shifting assembly comprising an input hub coupled to the input member, with the input hub having a disconnectable component engageable with the disconnect, and with the input hub having a clutch engagement component, a plurality of clutch plates coupled to the clutch engagement component of the input hub, and a clutch plate carrier coupled to the plurality of clutch plates and to the output member to transmit torque from the clutch engagement component of the input hub through the plurality of clutch plates and the clutch plate carrier to the output member, said method comprising the steps of:
  moving the selectable one-way clutch from a first clutch position where the selectable one-way clutch is configured to allow torque to be transmitted through one of the first and second gear ratios from the input member in either a first rotational direction or a second rotational direction opposite the first rotational direction, to a second clutch position where the selectable one-way clutch is configured to allow torque to be transmitted through one of the first and second gear ratios from the input member in the first rotational direction and prevent torque from being transmitted through one of the first and second gear ratios from the input member in the second rotational direction;
  moving the plurality of clutch plates from an engaged position, where the clutch plates are engaged with one another, to a disengaged position, where the clutch plates are disengaged from one another;
  moving the disconnect from a first disconnect position, where the disconnectable component of the input hub is disengaged from the disconnect, to a second disconnect position, where the disconnectable component of the input hub is engaged with the disconnect; and moving the selectable one-way clutch from the second clutch position, to a third clutch position where the selectable one-way clutch is configured to prevent torque from being transmitted through one of the first and second gear ratios from the input member in either the first rotational direction or the second rotational direction to shift the transmittance of torque from the input member through one of the first and second gear ratios, to from the input member through the other of the first and second gear ratios.

16. The method as set forth in claim 15, wherein the step of moving the selectable one-way clutch from the first clutch position to the second clutch position precedes the step of moving the plurality of clutch plates from the engaged position to the disengaged position.

17. The method as set forth in claim 15, wherein the step of moving the plurality of clutch plates from the engaged position to the disengaged position precedes the step of moving the disconnect from the first disconnect position to the second disconnect position.

18. The method as set forth in claim 15, wherein the step of moving the disconnect from the first disconnect position to the second disconnect position precedes the step of moving the selectable one-way clutch from the second clutch position to the third clutch position.

19. The method as set forth in claim 15 further comprising the step of moving the plurality of clutch plates from the disengaged position to the engaged position.

20. The method as set forth in claim 19, wherein the step of moving the disconnect from the first disconnect position to the second disconnect position precedes the step of moving the plurality of clutch plates from the disengaged position to the engaged position.

\* \* \* \* \*